US012316480B2

(12) United States Patent
Regev et al.

(10) Patent No.: US 12,316,480 B2
(45) Date of Patent: May 27, 2025

(54) TECHNIQUES FOR DOWNLINK CHANNEL ESTIMATION

(71) Applicant: QUALCOMM Incorporated, San Diego, CA (US)

(72) Inventors: Aviv Regev, Tel aviv (IL); Amit Bar-Or Tillinger, Tel-Aviv (IL); Shay Landis, Hod Hasharon (IL); Yaniv Eistein, Tel Aviv (IL); Ronen Shaked, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 18/500,737

(22) Filed: Nov. 2, 2023

(65) Prior Publication Data
US 2025/0150309 A1     May 8, 2025

(51) Int. Cl.
*H04W 16/28*     (2009.01)
*H04L 25/02*     (2006.01)
*H04W 72/23*     (2023.01)

(52) U.S. Cl.
CPC ......... *H04L 25/0242* (2013.01); *H04W 72/23* (2023.01)

(58) Field of Classification Search
CPC ..... H04W 16/28; H04W 88/08; H04W 72/00; H04W 88/02; H04W 72/0453; H04W 64/00; H04W 12/065; H04W 12/069; H04W 12/12; H04L 25/0212; H04L 25/0204; H04L 27/2647; H04L 5/0023; H04L 25/0242; H04L 5/0007; H04L 2025/03414; H04L 25/021; H04B 7/0626; H04B 7/0443; H04B 7/10; H04B 1/1081;
(Continued)

(56) References Cited

U.S. PATENT DOCUMENTS

2013/0235818 A1\* 9/2013 Yuan ..................... H04W 56/00
                                                    370/329
2019/0320453 A1\* 10/2019 Hosseini ............... H04L 5/0051
(Continued)

OTHER PUBLICATIONS

CATT: "CSI Enhancement for High/medium UE Velocities and Coherent JT", 3GPPTSG-RAN WG1 #111, R1-2211169, Type Discussion, NR_MIMO_EVO_DL_UL-CORE, 3rd Generation Partnership Project (3GPP), Mobile Competence Centre, 650, Route Des Lucioles, F-06921 Sophia-Antipolis Cedex, vol. RAN WG1, No. Toulouse, France, Nov. 14-18, 2022, Nov. 7, 2022, 17 Pages, XP052221734, Section 1, 2.2.
(Continued)

*Primary Examiner* — Eva Y Puente
(74) *Attorney, Agent, or Firm* — Holland & Hart LLP

(57) ABSTRACT

Methods, systems, and devices for wireless communications are described. Techniques described herein provide for a user equipment (UE) to determine a channel estimation associated with a downlink channel. In some examples, a network entity may determine a projection matrix and may transmit, to the UE, control signaling indicating the projection matrix. The UE may determine the channel estimation associated with the downlink channel based on the projection matrix. The UE may receive data signaling from the network entity, and the UE may demodulate the data signaling according to the channel estimation that is based at least in part on the projection matrix.

30 Claims, 15 Drawing Sheets

(58) Field of Classification Search
CPC .. H04B 7/0469; H04B 7/0615; H04B 7/0619; H04B 7/0658; H04B 7/0669
See application file for complete search history.

(56) References Cited

U.S. PATENT DOCUMENTS

| | | | |
|---|---|---|---|
| 2020/0274592 A1* | 8/2020 | Mandula | H04L 25/0204 |
| 2023/0051245 A1 | 2/2023 | Yue et al. | |
| 2023/0114659 A1* | 4/2023 | Taherzadeh Boroujeni | H04L 1/08 370/329 |

OTHER PUBLICATIONS

International Search Report and Written Opinion—PCT/US2024/049671—ISA/EPO—Dec. 23, 2024.
Ma X., et al., "Low-Complexity Channel Estimation for 3GPP LTE Terminals", European Wireless 2012, 18th European Wireless Conference, Apr. 18-20, 2012, Poznan, Poland, Apr. 18, 2012, 7 Pages, XP093168433, Abstract, Sections III, IV.A, IV.C.

* cited by examiner

TECHNIQUES FOR DOWNLINK CHANNEL ESTIMATION

FIELD OF TECHNOLOGY

The following relates to wireless communications, including techniques for downlink channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for downlink channel estimation. For example, the described techniques provide for a user equipment (UE) to determine a channel estimation associated with a downlink channel. In some examples, a network entity may determine a projection matrix and may transmit, to the UE, control signaling indicating the projection matrix. The UE may determine the channel estimation associated with the downlink channel based on the projection matrix. The UE may receive data signaling from the network entity, and the UE may demodulate the data signaling according to the channel estimation that is based at least in part on the projection matrix.

A method for wireless communication by a UE is described. The method may include transmitting, to a network entity, first control signaling including a first shifting time offset indication associated with a downlink channel of a cell associated with the network entity, receiving, from the network entity based on transmitting the first control signaling, second control signaling indicating a projection matrix associated with the downlink channel, receiving data signaling from the network entity on the downlink channel based on receiving the second control signaling, and demodulating the data signaling according to a channel estimation associated with the downlink channel that is based on the projection matrix.

A UE for wireless communication is described. The UE may include one or more memories storing processor executable code, and one or more processors coupled with the one or more memories. The one or more processors may individually or collectively operable to execute the code to cause the UE to transmit, to a network entity, first control signaling including a first shifting time offset indication associated with a downlink channel of a cell associated with the network entity, receive, from the network entity based on transmitting the first control signaling, second control signaling indicating a projection matrix associated with the downlink channel, receive data signaling from the network entity on the downlink channel based on receiving the second control signaling, and demodulate the data signaling according to a channel estimation associated with the downlink channel that is based on the projection matrix.

Another UE for wireless communication is described. The UE may include means for transmitting, to a network entity, first control signaling including a first shifting time offset indication associated with a downlink channel of a cell associated with the network entity, means for receiving, from the network entity based on transmitting the first control signaling, second control signaling indicating a projection matrix associated with the downlink channel, means for receiving data signaling from the network entity on the downlink channel based on receiving the second control signaling, and means for demodulating the data signaling according to a channel estimation associated with the downlink channel that is based on the projection matrix.

A non-transitory computer-readable medium storing code for wireless communication is described. The code may include instructions executable by a processor to transmit, to a network entity, first control signaling including a first shifting time offset indication associated with a downlink channel of a cell associated with the network entity, receive, from the network entity based on transmitting the first control signaling, second control signaling indicating a projection matrix associated with the downlink channel, receive data signaling from the network entity on the downlink channel based on receiving the second control signaling, and demodulate the data signaling according to a channel estimation associated with the downlink channel that is based on the projection matrix.

In some examples of the method, user equipment (UEs), and non-transitory computer-readable medium described herein, the downlink channel and an uplink channel of the cell may be time division multiplexed.

In some examples of the method, user equipment (UEs), and non-transitory computer-readable medium described herein, receiving the data signaling may include operations, features, means, or instructions for receiving, from the network entity, a reference signal and determining the channel estimation based on the projection matrix and the reference signal.

In some examples of the method, user equipment (UEs), and non-transitory computer-readable medium described herein, determining the channel estimation may include operations, features, means, or instructions for descrambling the reference signal and determining the channel estimation based on the projection matrix and the descrambled reference signal.

In some examples of the method, user equipment (UEs), and non-transitory computer-readable medium described herein, in the projection matrix may be based on a time domain channel autocorrelation associated with an uplink channel of the cell, a noise covariance associated with the uplink channel, a Fast Fourier Transform matrix based on the first shifting time offset indication, or a combination thereof.

Some examples of the method, user equipment (UEs), and non-transitory computer-readable medium described herein may further include operations, features, means, or instructions for transmitting, to the network entity, third control signaling indicating a channel power delay profile associated with the UE, where the projection matrix may be based on the channel power delay profile.

Some examples of the method, user equipment (UEs), and non-transitory computer-readable medium described herein may further include operations, features, means, or instructions for transmitting, to the network entity, third control signaling indicating a channel state information report associated with the downlink channel, where the projection matrix may be based on the channel state information report.

Some examples of the method, user equipment (UEs), and non-transitory computer-readable medium described herein may further include operations, features, means, or instructions for transmitting, to the network entity, third control signaling indicating a second shifting time offset indication associated with the downlink channel, where the second shifting time offset indication may be different from the first shifting time offset indication, receiving, from the network entity based on transmitting the third control signaling, fourth control signaling indicating a second projection matrix associated with the downlink channel, receiving second data signaling, from the network entity on the downlink channel based on receiving the fourth control signaling, and demodulating the second data signaling according to a second channel estimation that may be based on the second projection matrix.

A method for wireless communication by a network entity is described. The method may include receiving, from a UE, first control signaling indicating a first shifting time offset indication associated with a downlink channel of a cell associated with the network entity, transmitting, to the UE, second control signaling indicating a projection matrix associated with the downlink channel, where the projection matrix is determined based on the first shifting time offset indication, and transmitting data signaling to the UE on the downlink channel based on transmitting the second control signaling.

A network entity for wireless communication is described. The network entity may include one or more memories storing processor executable code, and one or more processors coupled with the one or more memories. The one or more processors may individually or collectively operable to execute the code to cause the network entity to receive, from a UE, first control signaling indicating a first shifting time offset indication associated with a downlink channel of a cell associated with the network entity, transmit, to the UE, second control signaling indicating a projection matrix associated with the downlink channel, where the projection matrix is determined based on the first shifting time offset indication, and transmit data signaling to the UE on the downlink channel based on transmitting the second control signaling.

Another network entity for wireless communication is described. The network entity may include means for receiving, from a UE, first control signaling indicating a first shifting time offset indication associated with a downlink channel of a cell associated with the network entity, means for transmitting, to the UE, second control signaling indicating a projection matrix associated with the downlink channel, where the projection matrix is determined based on the first shifting time offset indication, and means for transmitting data signaling to the UE on the downlink channel based on transmitting the second control signaling.

A non-transitory computer-readable medium storing code for wireless communication is described. The code may include instructions executable by a processor to receive, from a UE, first control signaling indicating a first shifting time offset indication associated with a downlink channel of a cell associated with the network entity, transmit, to the UE, second control signaling indicating a projection matrix associated with the downlink channel, where the projection matrix is determined based on the first shifting time offset indication, and transmit data signaling to the UE on the downlink channel based on transmitting the second control signaling.

Some examples of the method, network entities, and non-transitory computer-readable medium described herein may further include operations, features, means, or instructions for determining a channel estimation associated with an uplink channel of the cell, where the projection matrix may be determined based on the channel estimation.

In some examples of the method, network entities, and non-transitory computer-readable medium described herein, the downlink channel and an uplink channel of the cell may be time division multiplexed.

Some examples of the method, network entities, and non-transitory computer-readable medium described herein may further include operations, features, means, or instructions for transmitting, to the UE based on transmitting the projection matrix, a reference signal.

Some examples of the method, network entities, and non-transitory computer-readable medium described herein may further include operations, features, means, or instructions for receiving, from the UE, third control signaling indicating a channel state information report associated with the downlink channel, where the projection matrix may be based on the channel state information report.

Some examples of the method, network entities, and non-transitory computer-readable medium described herein may further include operations, features, means, or instructions for determining, in response to receiving the first control signaling, the projection matrix based on a time domain channel autocorrelation associated with an uplink channel of the cell, a noise covariance associated with the uplink channel, a Fast Fourier Transform matrix based on the first shifting time offset indication, or a combination thereof.

In some examples of the method, network entities, and non-transitory computer-readable medium described herein, determining the projection matrix may include operations, features, means, or instructions for determining the Fast Fourier Transform matrix based on a power delay profile associated with the network entity.

In some examples of the method, network entities, and non-transitory computer-readable medium described herein, determining the projection matrix may include operations, features, means, or instructions for determining the time domain channel autocorrelation based on a power delay profile associated with the network entity.

In some examples of the method, network entities, and non-transitory computer-readable medium described herein, determining the projection matrix may include operations, features, means, or instructions for receiving, from the UE, a third control signaling indicating a channel power delay profile associated with the UE and determining the projection matrix based on the channel power delay profile associated with the UE.

Some examples of the method, network entities, and non-transitory computer-readable medium described herein may further include operations, features, means, or instructions for transmitting, to the UE based on determining a change of a power delay profile associated with the network entity, fourth control signaling indicating a second projection matrix associated with a channel estimation of an uplink channel of the network entity.

Some examples of the method, network entities, and non-transitory computer-readable medium described herein may further include operations, features, means, or instructions for receiving, from the UE, a third control signaling indicating a second shifting time offset indication associated with the downlink channel of the UE, where the second shifting time offset indication may be different from the first shifting time offset indication and transmitting, to the UE based on transmitting the third control signaling, fourth control signaling indicating a second projection matrix associated with a channel estimation of an uplink channel of the network entity.

DETAILED DESCRIPTION

Wireless communications systems may support channel estimations. For example, a wireless device may estimate resources of a channel to maintain high data throughput. The channel estimation may be a complex procedure performed by a user equipment (UE) of the communications system. The UE may complete the channel estimation for the downlink channel prior to demodulating data signaling, and decoding of data may be delayed by the UE until the channel estimation is completed. The channel estimation procedure by the UE may provide a processing time delay that contributes to an overall demodulation process latency at the UE. Additionally, the channel estimation procedure by the UE may consume substantial device power.

Techniques for downlink channel estimation described herein may reduce the latency at the UE and may reduce power consumed by the UE. In some examples, a network entity may determine a projection matrix and may transmit, to the UE, control signaling indicating the projection matrix. The UE may determine a channel estimation associated with a downlink channel based on the projection matrix. The UE may receive data signaling from the network entity, and the UE may demodulate the data signaling according to the channel estimation that is based at least in part on the projection matrix.

In some examples, the network entity may determine the projection matrix based on a time domain channel autocorrelation associated with the uplink channel, a noise covariance associated with the uplink channel, a Fast Fourier Transform matrix, or a combination thereof. In some cases, the UE transmits, to the network entity, control signaling indicating a shifting time offset indication associated with the downlink channel, and the network entity determines the Fast Fourier Transform matrix based on the shifting time offset indication. After receiving the projection matrix, the UE may determine the channel estimation associated with the downlink channel based on the projection matrix (e.g., using a reference signal received from the network entity).

Aspects of the disclosure are initially described in the context of wireless communications systems. Aspects of the disclosure are also described in context of a process flow. Aspects of the disclosure are further illustrated by and described with reference to apparatus diagrams, system diagrams, and flowcharts that relate to techniques for downlink channel estimation.

Figure 1:
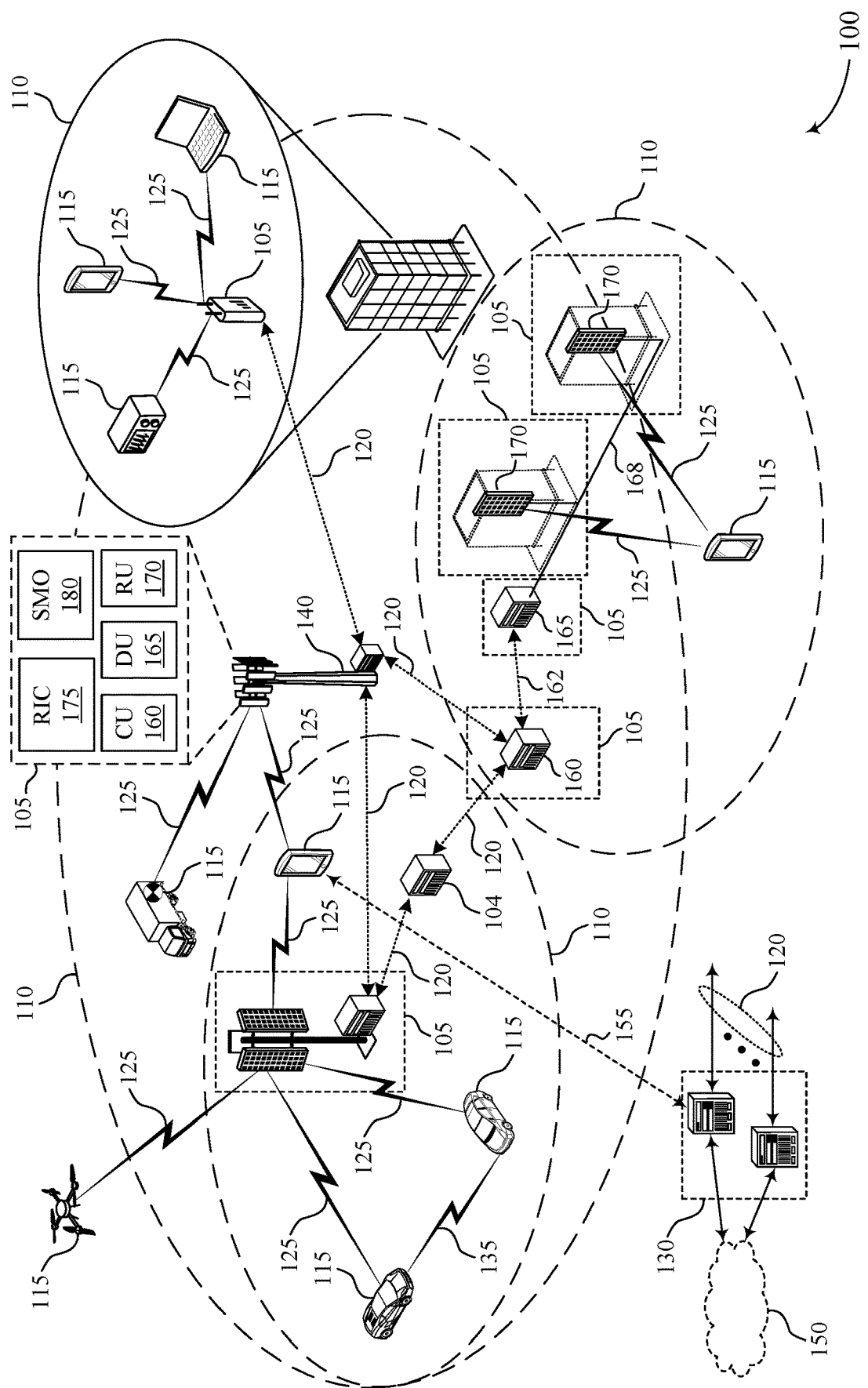
FIG. 1 shows an example of a wireless communications system that supports techniques for downlink channel estimation in accordance with one or more aspects of the present disclosure.

FIG. 1 shows an example of a wireless communications system 100 that supports techniques for downlink channel estimation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for downlink channel estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

Wireless communications systems may support channel estimations. For example, a wireless device may estimate resources of a channel to maintain high data throughput. The channel estimation may be a complex procedure performed by the UE 115 of the communications system 100. The UE 115 may complete the channel estimation for the downlink channel prior to demodulating data signaling, and data decoding may be delayed by the UE 115 until the channel estimation is completed. The channel estimation procedure by the UE 115 may provide a processing time delay that contributes to an overall demodulation process latency at the UE 115. Additionally, the channel estimation procedure by the UE 115 may consume substantial device power.

Techniques for downlink channel estimation may reduce the latency at the UE 115 and may reduce power consumed by the UE 115. In some examples, a network entity 105 may determine a projection matrix and may transmit, to the UE 115, control signaling indicating the projection matrix. The UE 115 may determine a channel estimation associated with a downlink channel based on the projection matrix. The UE 115 may receive data signaling from the network entity 105, and the UE 115 may demodulate the data signaling according to the channel estimation that is based at least in part on the projection matrix.

In some examples, the network entity 105 may determine the projection matrix based on a time domain channel autocorrelation associated with the uplink channel, a noise covariance associated with the uplink channel, and a Fast Fourier Transform matrix. In some cases, the UE 115 transmits, to the network entity 105, control signaling indicating a shifting time offset indication associated with the downlink channel, and the network entity 105 determines the Fast Fourier Transform matrix based on the shifting time offset indication. After receiving the projection matrix, the UE 115 may determine the channel estimation associated with the downlink channel based on the projection matrix (e.g., using a reference signal received from the network entity 105).

Figure 2:
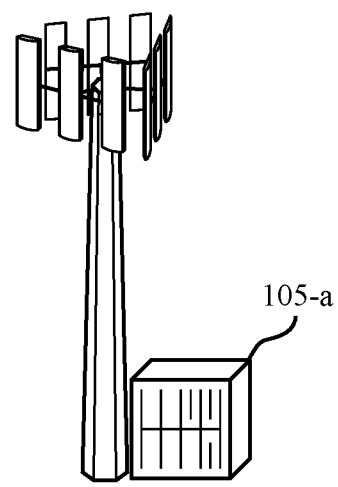
FIG. 2 shows an example of a wireless communications system that supports techniques for downlink channel estimation in accordance with one or more aspects of the present disclosure.
Figure 2:
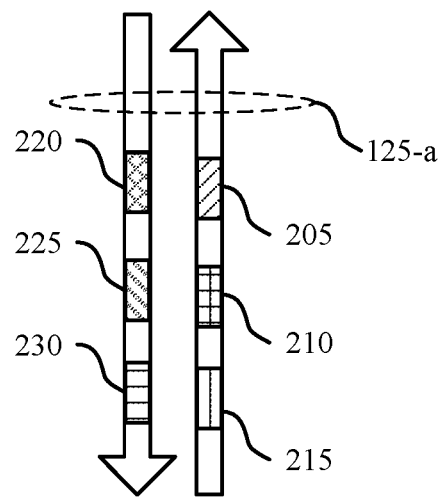
Figure 2:
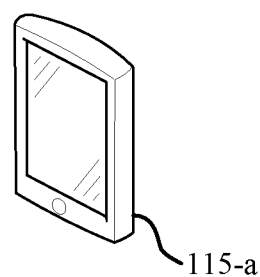
Figure 2:

FIG. 2 shows an example of a wireless communications system 200 that supports techniques for downlink channel estimation in accordance with one or more aspects of the present disclosure. The wireless communications system 200 may implement aspects of or may be implemented by aspects of the wireless communications system 100. For example, the wireless communications system 200 includes a UE 115-a, which may be an example of a UE 115 as described herein. The wireless communications system 200 may also include a network entity 105-a, which may be an example of a network entity 105 as described herein.

The UE 115-a may communicate with the network entity 105-a using a communication link 125-a. The communication link 125-a may be an example of an NR or LTE link between the UE 115-a and the network entity 105-a. The communication link 125-a may include bi-directional links that enable both uplink and downlink communications. For example, the UE 115-a may transmit uplink signals (e.g., uplink transmissions), such as uplink control signaling and uplink data signals, to the network entity 105-a using the communication link 125-a, and the network entity 105-a may transmit downlink signals (e.g., downlink transmissions), such as downlink control signaling and downlink data signals, to the UE 115-a using the communication link 125-a.

In some examples, the UE 115-a may perform channel estimation to determine channel characteristics and estimate resources of a channel of communication link 125-a to maintain high data throughput. Channel estimation may be one of the most complex procedures at the UE 115-a of an OFDM communications system. In some examples, the channel estimation may be performed based on transmitted pilots prior to demodulation of received data. Decoding of the data may be delayed by the UE 115-a until the channel estimation procedure is completed. Therefore, improving a processing time delay of the channel estimation may reduce an overall demodulation process latency at the UE 115-a. In addition, the channel estimation procedure may consume substantial UE device power and may add a significant amount of complexity to the demodulation process for each downlink slot reception mainly due to a large matrix inversion operation. Reducing power consumption by the UE 115-a may, for example, be relevant when the UE 115-a is a device such as augmented reality glasses or virtual reality glasses.

In some examples, a portion of the channel estimation procedure for the UE 115-a may be performed by the network entity 105-a by utilizing reciprocity of the uplink channel and the downlink channel (e.g., when the communication link 125-a is a TDD communication link). The network entity 105-a may perform calculations for the downlink channel estimation and may transmit control signaling indicating values of the performed calculations to the UE 115-a. The network entity 105-a may determine a time domain autocorrelation ($R_{hh}$) and a delay spread. In addition, the network entity 105-a may determine a noise covariance ($R_{nn}$) from a CSI RS report from the UE 115-a. Using the time channel autocorrelation, the delay spread, and the noise covariance, the network entity 105-a may perform calculations that replace a portion of the role of the UE 115-a in the channel estimation calculation associated with the downlink channel. In some cases, the network entity 105-a may calculate a projection matrix and may transmit control signaling indicating the projection matrix to the UE 115-a once in several slots. The UE 115-a may multiply the projection matrix with observed data in order to yield the estimated time domain channel. The UE 115-a may utilize the reciprocity and calculations from the network entity 105-a to determine a low complexity channel estimation that reduces latency and power consumption.

In some examples, the network entity 105-a may compute the projection matrix based on the following mathematical equations for single input and single output communications systems, and the mathematical equations may be applied to multiple input and multiple output communications systems. For example, an observed pilots signal (e.g., DMRS OFDM symbol) at the UE 115-a may be described by the expression $$y = H_k^{Diag} d_k + n$$

where y is an observed signal vector of size number of subcarriers (Nsc) by one, d is a transmitted pilots vector of size Nsc by one, n is an additive noise vector of size Nsc by one, and $H^{Diag}$ is an Nsc by Nsc diagonal matrix where the frequency domain channel is lying on the diagonal. A first transition is y=DH+n where D is an Nsc by Nsc diagonal matrix where the pilots are lying on the diagonal and H is an Nsc by one vector of a frequency domain channel. A transition from the frequency domain channel H to a time domain channel h may be given by $H=F_C h$ where h is a time domain channel vector of size DS by one where DS is the delay spread in taps, and Fe is a Fast Fourier transform matrix cut to row and columns according to the occupied subcarriers. Under an assumption that a power of the pilots is a unity power (e.g., 1 (0 dB)), $z=D^H y=H+D^H n=F_C h+D^H n$ is a descrambled channel. The time domain channel linear minimum mean square error (LMMSE) estimator from the descrambled channel may be given by $\hat{h}(z)=E\{hz^H\} E\{zz^H\}^{-1}z$ where $E\{\cdot\}$ is the expectation operator, $E\{hz^H\}=R_{hh} F_C^H$ and $E\{zz^H\}=F_C R_{hh} F_C^H+R_{nn}$ where $R_{hh}$ the time domain autocorrelation and $R_{nn}$ is the noise covariance. The LMMSE time domain channel estimator may be given up $$\hat{h}(z) = \underbrace{\left(R_{hh}F_C^H\left(F_C R_{hh} F_C^H + R_{nn}\right)^{-1}\right)}_{\Psi} z = \Psi z$$

where $\Psi$ is the project matrix. The network entity 105-a may calculate the projection matrix that leads to the time domain channel at the network entity 105-a. The network entity 105-a may transmit, to the UE 115-a, control signaling indicating the projection matrix over the downlink. The UE 115-a may complete a construction of the estimated time domain channel as the projection matrix multiplied by a descrambled signal (e.g., $\Psi*z$).

In some examples, to determine the downlink channel estimation, the UE 115-a may transmit control signaling 205 comprising a shifting time offset indication associated with a downlink channel of a cell associated with the network entity 105-a. The UE 115-a may estimate a location of the first tap (e.g., shifting time offset) of the channel with respect to Fast Fourier Transform window of the channel. For example, the UE 115-a may determine a correlation calculation between observed pilots and reference pilots. In some cases, the shifting time offset indication may be transmitted over a physical uplink control channel. The shifting time offset information may be used by the network entity 105-a to calculate the Fast Fourier transform matrix ($F_c$).

The network entity 105-a may calculate the projection matrix ($\Psi$) as $\Psi=R_{hh}F_C^H(F_C R_{hh} F_C^H+R_{nn})^{-1}$. For example, the network entity 105-a may determine the projection matrix components of the time domain autocorrelation ($R_{hh}$), the noise covariance ($R_{nn}$) and the Fast Fourier transform matrix ($F_c$). In some cases, the network entity 105-a may determine the time domain autocorrelation ($R_{hh}$) using a channel power delay profile from an uplink channel estimation. The network entity 105-a may use reciprocity to derive the downlink channel estimation. Without the reciprocity assumption, the UE 115-a may transmit, to the network entity 105-a over the uplink channel, control signaling 210 indicating a channel power delay profile associated with the UE 115-a, and the network entity 105-a may determine the time domain autocorrelation ($R_{hh}$) using the channel power delay profile from the UE 115-a. In some examples, the network entity 105-a may determine the Fast Fourier transform matrix ($F_c$) according to occupied bandwidth of the UE 115-a, the shifting time offset provided by the UE 115-a, and a delay spread from the power delay profile estimation by the network entity 105-a. In some cases, the UE 115-a may transmit control signaling indicating the channel power delay profile over the uplink channel, and the network entity 105-a may determine the Fast Fourier transform matrix (Fc) using a delay spread from the power delay profile estimation provided by the UE 115-a. In some cases, the network entity 105-a may determine the noise covariance ($R_{nn}$) using information from a CSI-RS report (e.g., CSI-RS report from the UE 115-a). For example, the UE 115-a may transmit, to the network entity 105-a, control signaling 215 indicating a CSI-RS report associated with the downlink channel. In some examples, the network entity 105-a may determine the noise covariance ($R_{nn}$) using an identity matrix multiplied by some default signal to noise ratio.

After determining the projection matrix (Y), the network entity 105-a may transmit, to the UE 115-a, control signaling 220 indicating the calculated projection matrix. In some cases, the physical downlink control channel may be used for transmitting the projection matrix. The network entity 105-a may transmit, to the UE 115-a, a reference signal 225. In some examples, the UE 115-a may descramble the reference signal. The UE 115-a may determine the channel estimation by multiplying the projection matrix with the descrambled reference signal. The UE 115-a may receive data signaling 230 from the network entity 105-a on the downlink channel. The UE 115-a may demodulate the data signaling according to the channel estimation of the downlink channel based on the projection matrix.

In some cases, whenever one of the parameters used to determine the projection matrix, such as the shifting time offset, the noise covariance ($R_{nn}$) and the time domain autocorrelation ($R_{hh}$), changes, the network entity 105-a may determine an updated projection matrix and may transmit control signaling indicating the updated projection matrix to the UE 115-a. For example, if the shifting time offset changes, the UE 115-a may transmit, to the network entity, control signaling indicating an updated shifting time offset indication to the network entity 105-a, and the network entity may determine the updated projection matrix using the updated shifting time offset indication.

Figure 3:
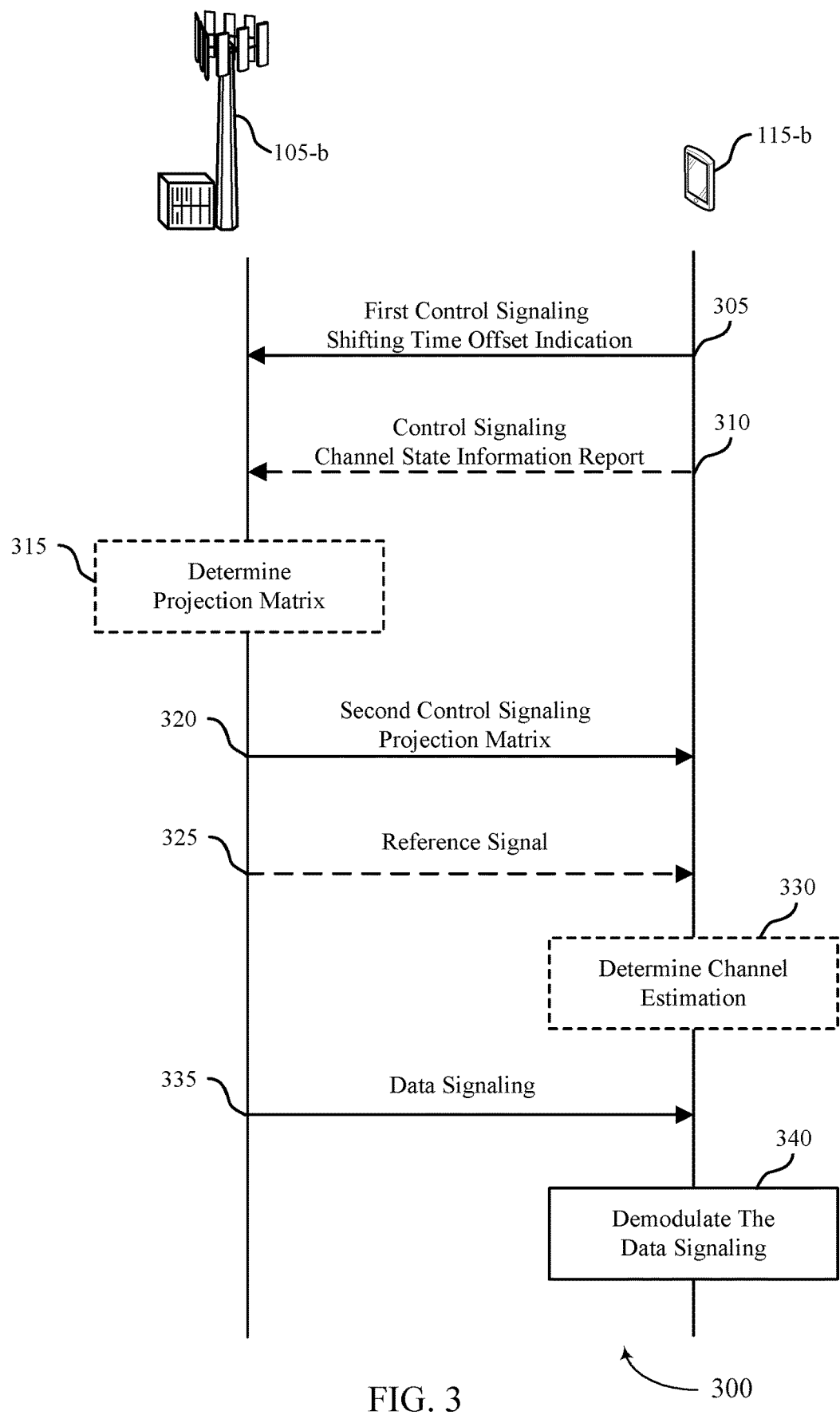
FIG. 3 shows an example of a process that supports techniques for downlink channel estimation in accordance with one or more aspects of the present disclosure.

FIG. 3 shows an example of a process flow 300 that supports techniques for downlink channel estimation in accordance with one or more aspects of the present disclosure. In some examples, the process flow 300 may implement or be implemented by aspects of the wireless communications systems 100 and 200 as described with reference to FIGS. 1 and 2, respectively. For example, the process flow 300 may be implemented by a network entity 105-b, which may be an example of the network entities 105 as described with reference to FIGS. 1 and 2. The process flow 300 may be implemented by a UE 115-b, which may be an example of the UEs as described with reference to FIGS. 1 and 2.

In some examples, the operations illustrated in process flow 300 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 305, the UE 115-b may transmit, to the network entity 105-b, first control signaling comprising a first shifting time offset indication associated with a downlink channel of a cell associated with the network entity 105-a. In some examples, the downlink channel and an uplink channel are time division multiplexed.

At 310, the UE **115-*b* may transmit, to the network entity 105-*b***, control signaling indicating a channel state information report associated with the downlink channel.

At 315, the network entity **105-*b* may determine a projection matrix associated with the downlink channel. In some examples, the network entity 105-*b* may determine a channel estimation associated with an uplink channel of the cell, and the projection matrix may be determined based at least in part on the channel estimation. In some cases, the projection matrix may be based at least in part on the channel state information report. In some cases, the projection matrix may be based at least in part on a time domain channel autocorrelation associated with the uplink channel of the cell, a noise covariance associated with the uplink channel, a Fast Fourier Transform matrix based at least in part on the first shifting time offset indication, or a combination thereof. In some cases, the network entity 105-*b* may determine the Fast Fourier Transform matrix based at least in part on a power delay profile associated with the network entity 105-*b*. In some examples, the network entity 105-*b* may determine the time domain channel autocorrelation based at least in part on a power delay profile associated with the network entity 105-*b*. In some cases, the network entity 105-*b* may receive, from the UE 115-*b*, control signaling indicating a channel power delay profile associated with the UE 115-*b*, and the network entity 105-*b* may determine the projection matrix based at least in part on the channel power delay profile associated with the UE 115-*b***.

At 320, the UE **115-*b* may receive, from the network entity 105-*b***, second control signaling indicating a projection matrix associated with the downlink channel.

At 325, the UE **115-*b* may receive, from the network entity 105-*b***, a reference signal.

At 330, the UE **115-*b* may determine a channel estimation associated with the downlink channel based at least in part on the projection matrix. In some cases, the UE 115-*b* may determine the channel estimation associated with the downlink channel based at least in part on the projection matrix (e.g., using the reference signal). In some examples, the UE 115-*b*** may descramble the reference signal and may determine the channel estimation based at least in part on the projection matrix and the descrambled reference signal (e.g., multiplying the projection matrix with the descrambled reference signal).

At 335, the UE **115-*b* may receive, from the network entity 105-*b***, data signaling on the downlink channel.

At 340, the UE **115-*b*** may demodulate the data signaling according to the channel estimation associated with the downlink channel that is based at least in part on the projection matrix.

One or more of the steps for performing channel estimation using the projection matrix may be repeated based on a change in the associated parameters (e.g., the shifting time offset, the time domain autocorrelation, the noise covariance). In some cases, the UE **115-*b* may transmit, to the network entity 105-*b*, control signaling indicating a second shifting time offset indication associated with the downlink channel, and the second shifting time offset indication is different from the first shifting time offset indication. The UE 115-*b* may receive, from the network entity 105-*b* based at least in part on transmitting the control signaling indicating a second shifting time offset indication, control signaling indicating a second projection matrix associated with the downlink channel. The UE 115-*b* may receive second data signaling from the network entity 105-*b* on the downlink channel based at least in part on receiving the control signaling indicating the second projection matrix. The UE 115-*b*** may demodulate the second data signaling according to a second channel estimation that is based at least in part on the second projection matrix.

In some examples, the network entity **105-*b* may transmit, to the UE 115-*b* based at least in part on determining a change of a power delay profile associated with the network entity 105-*b***, control signaling indicating a second projection matrix associated with a channel estimation of an uplink channel of the network entity.

Figure 4:
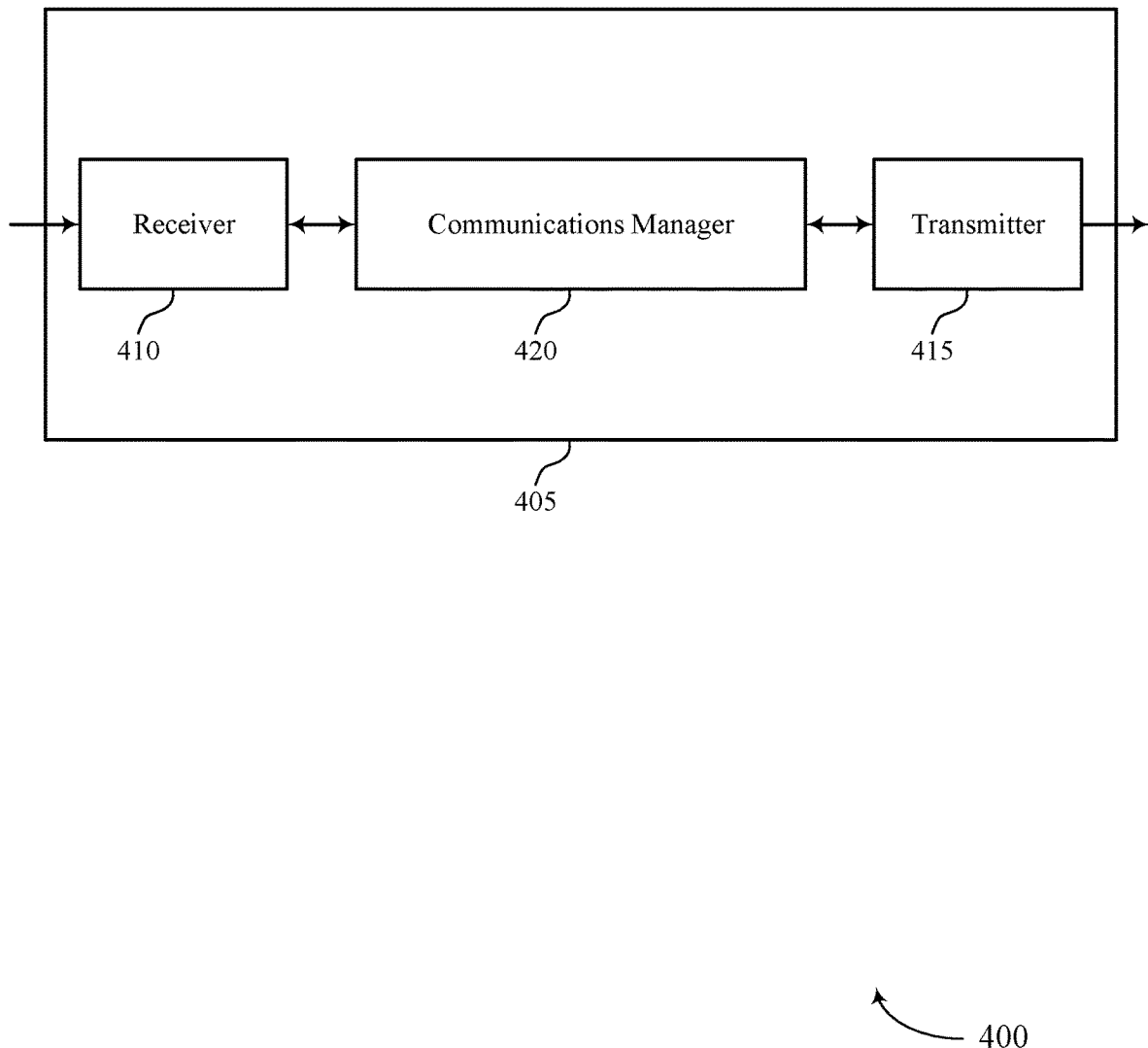
FIGS. 4 and 5 show block diagrams of devices that support techniques for downlink channel estimation in accordance with one or more aspects of the present disclosure.

FIG. 4 shows a block diagram 400 of a device 405 that supports techniques for downlink channel estimation in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for downlink channel estimation). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for downlink channel estimation). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for downlink channel estimation as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 is capable of, configured to, or operable to support a means for transmitting, to a network entity, first control signaling including a first shifting time offset indication associated with a downlink channel of a cell associated with the network entity. The communications manager 420 is capable of, configured to, or operable to support a means for receiving, from the network entity based on transmitting the first control signaling, second control signaling indicating a projection matrix associated with the downlink channel. The communications manager 420 is capable of, configured to, or operable to support a means for receiving data signaling from the network entity on the downlink channel based on receiving the second control signaling. The communications manager 420 is capable of, configured to, or operable to support a means for demodulating the data signaling according to a channel estimation associated with the downlink channel that is based on the projection matrix.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing, reduced power consumption, and more efficient utilization of communication resources.

Figure 5:
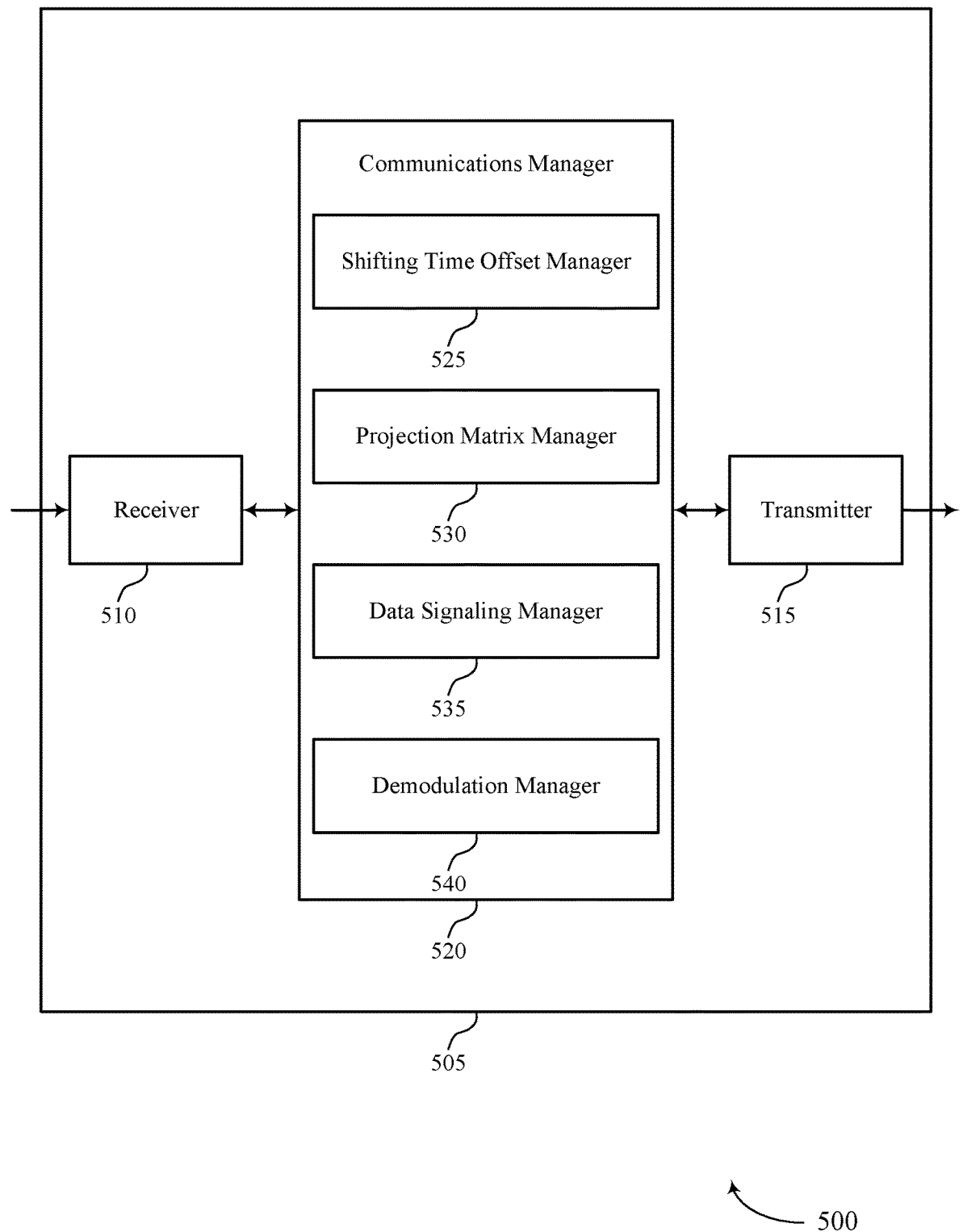

FIG. 5 shows a block diagram 500 of a device 505 that supports techniques for downlink channel estimation in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for downlink channel estimation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for downlink channel estimation). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for downlink channel estimation as described herein. For example, the communications manager 520 may include a shifting time offset manager 525, a projection matrix manager 530, a data signaling manager 535, a demodulation manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The shifting time offset manager 525 is capable of, configured to, or operable to support a means for transmitting, to a network entity, first control signaling including a first shifting time offset indication associated with a downlink channel of a cell associated with the network entity. The projection matrix manager 530 is capable of, configured to, or operable to support a means for receiving, from the network entity based on transmitting the first control signaling, second control signaling indicating a projection matrix associated with the downlink channel. The data signaling manager 535 is capable of, configured to, or operable to support a means for receiving data signaling from the network entity on the downlink channel based on receiving the second control signaling. The demodulation manager 540 is capable of, configured to, or operable to support a means for demodulating the data signaling according to a channel estimation associated with the downlink channel that is based on the projection matrix.

Figure 6:
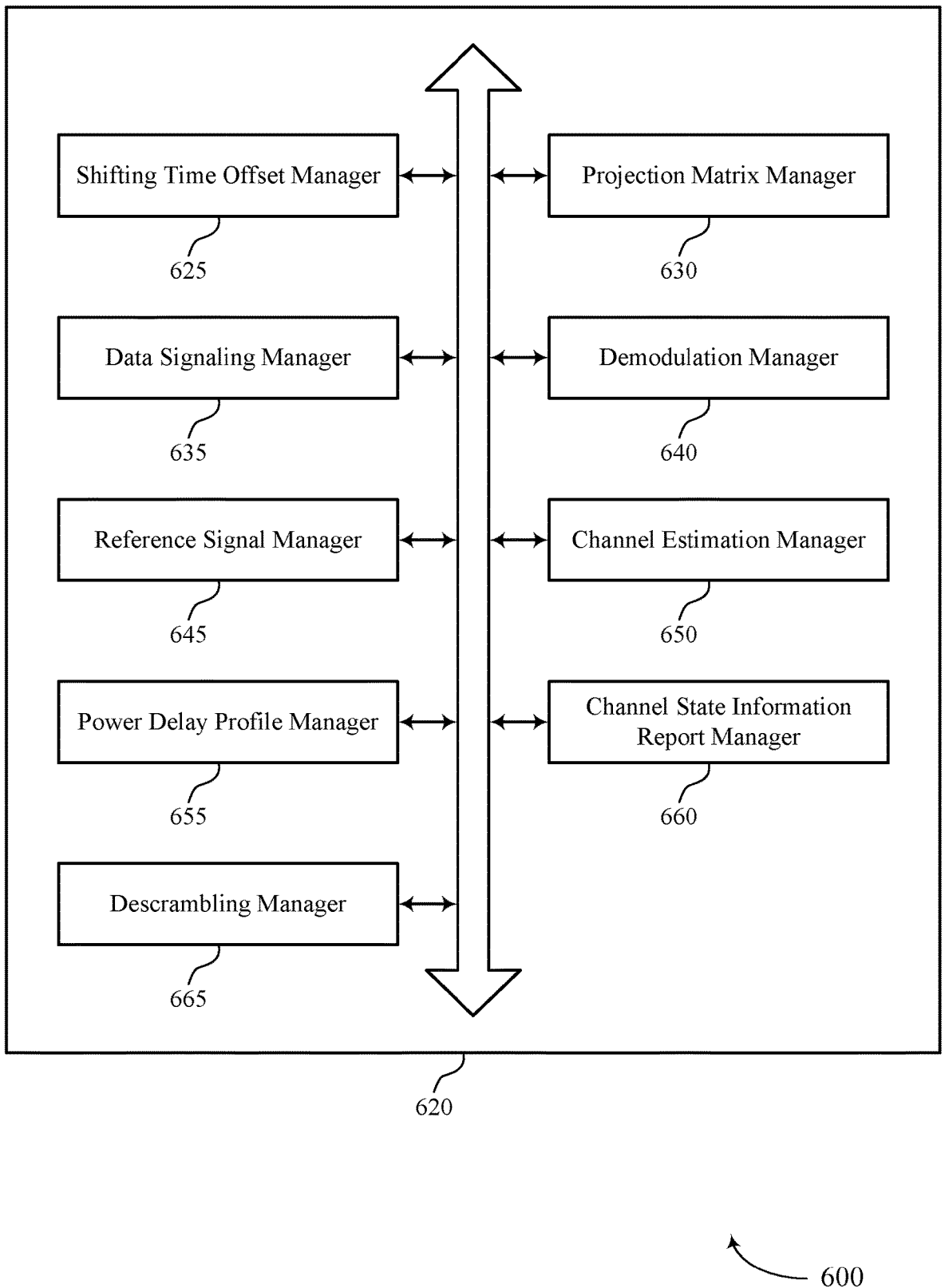
FIG. 6 shows a block diagram of a communications manager that supports techniques for downlink channel estimation in accordance with one or more aspects of the present disclosure.

FIG. 6 shows a block diagram 600 of a communications manager 620 that supports techniques for downlink channel estimation in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for downlink channel estimation as described herein. For example, the communications manager 620 may include a shifting time offset manager 625, a projection matrix manager 630, a data signaling manager 635, a demodulation manager 640, a reference signal manager 645, a channel estimation manager 650, a power delay profile manager 655, a channel state information report manager 660, a descrambling manager 665, or any combination thereof. Each of these components, or components or subcomponents thereof (e.g., one or more processors, one or more memories), may communicate, directly or indirectly, with one another (e.g., via one or more buses).

The communications manager 620 may support wireless communication in accordance with examples as disclosed herein. The shifting time offset manager 625 is capable of, configured to, or operable to support a means for transmitting, to a network entity, first control signaling including a first shifting time offset indication associated with a downlink channel of a cell associated with the network entity. The projection matrix manager 630 is capable of, configured to, or operable to support a means for receiving, from the network entity based on transmitting the first control signaling, second control signaling indicating a projection matrix associated with the downlink channel. The data signaling manager 635 is capable of, configured to, or operable to support a means for receiving data signaling from the network entity on the downlink channel based on receiving the second control signaling. The demodulation manager 640 is capable of, configured to, or operable to support a means for demodulating the data signaling according to a channel estimation associated with the downlink channel that is based on the projection matrix.

In some examples, the downlink channel and an uplink channel of the cell are time division multiplexed.

In some examples, to support receiving the data signaling, the reference signal manager 645 is capable of, configured to, or operable to support a means for receiving, from the network entity, a reference signal. In some examples, to support receiving the data signaling, the channel estimation manager 650 is capable of, configured to, or operable to support a means for determining the channel estimation based on the projection matrix and the reference signal.

In some examples, to support determining the channel estimation, the descrambling manager 665 is capable of, configured to, or operable to support a means for descrambling the reference signal. In some examples, to support determining the channel estimation, the channel estimation manager 650 is capable of, configured to, or operable to support a means for determining the channel estimation based on the projection matrix and the descrambled reference signal.

In some examples, in the projection matrix is based on a time domain channel autocorrelation associated with an uplink channel of the cell, a noise covariance associated with the uplink channel, a Fast Fourier Transform matrix based on the first shifting time offset indication, or a combination thereof.

In some examples, the power delay profile manager 655 is capable of, configured to, or operable to support a means for transmitting, to the network entity, third control signaling indicating a channel power delay profile associated with the UE, where the projection matrix is based on the channel power delay profile.

In some examples, the channel state information report manager 660 is capable of, configured to, or operable to support a means for transmitting, to the network entity, third control signaling indicating a channel state information report associated with the downlink channel, where the projection matrix is based on the channel state information report.

In some examples, the shifting time offset manager 625 is capable of, configured to, or operable to support a means for transmitting, to the network entity, third control signaling indicating a second shifting time offset indication associated with the downlink channel, where the second shifting time offset indication is different from the first shifting time offset indication. In some examples, the projection matrix manager 630 is capable of, configured to, or operable to support a means for receiving, from the network entity based on transmitting the third control signaling, fourth control signaling indicating a second projection matrix associated with the downlink channel. In some examples, the data signaling manager 635 is capable of, configured to, or operable to support a means for receiving second data signaling, from the network entity on the downlink channel based on receiving the fourth control signaling. In some examples, the demodulation manager 640 is capable of, configured to, or operable to support a means for demodulating the second data signaling according to a second channel estimation that is based on the second projection matrix.

Figure 7:
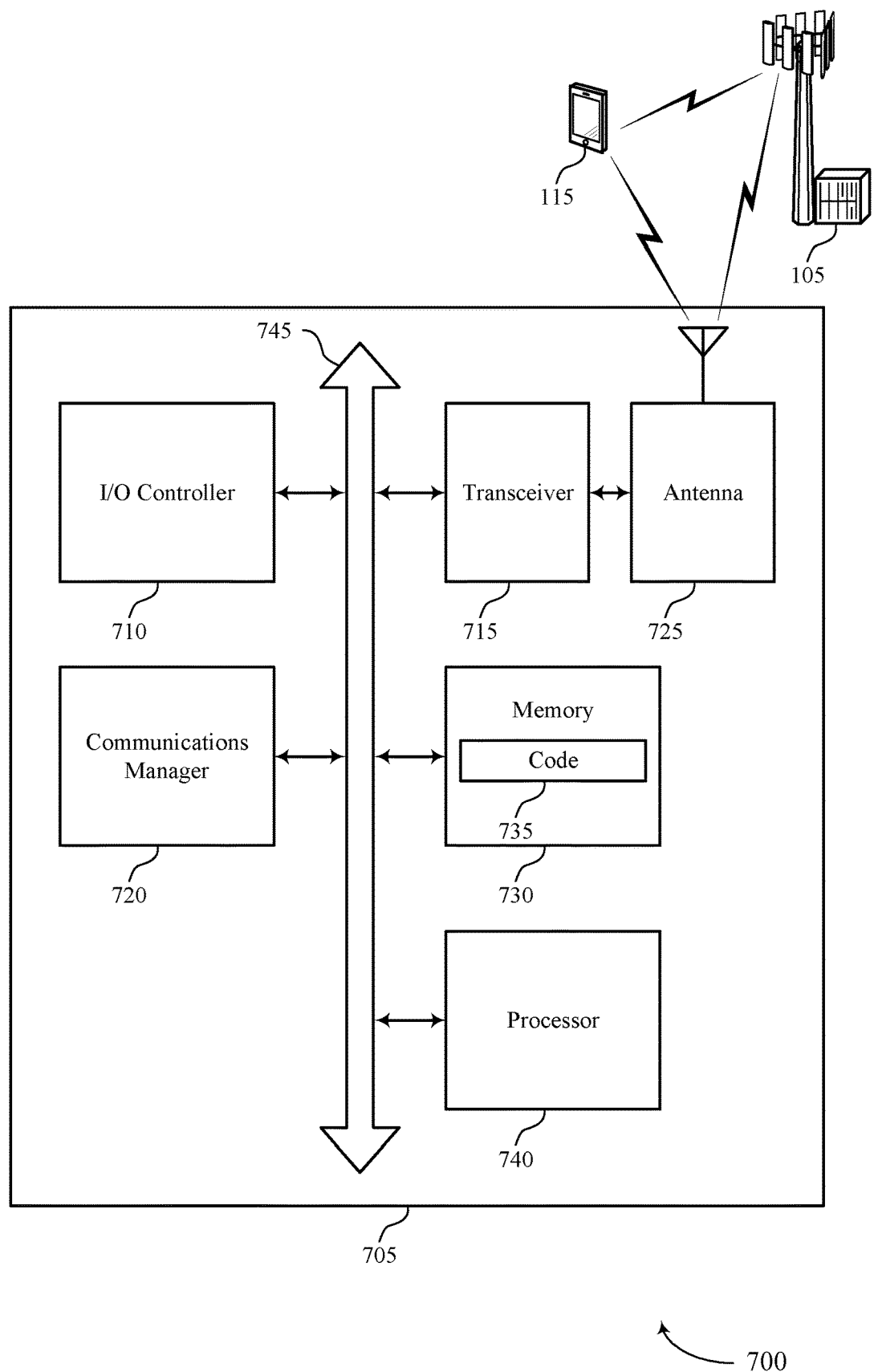
FIG. 7 shows a diagram of a system including a device that supports techniques for downlink channel estimation in accordance with one or more aspects of the present disclosure.

FIG. 7 shows a diagram of a system 700 including a device 705 that supports techniques for downlink channel estimation in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting techniques for downlink channel estimation). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communication in accordance with examples as disclosed herein. For example, the communications manager 720 is capable of, configured to, or operable to support a means for transmitting, to a network entity, first control signaling including a first shifting time offset indication associated with a downlink channel of a cell associated with the network entity. The communications manager 720 is capable of, configured to, or operable to support a means for receiving, from the network entity based on transmitting the first control signaling, second control signaling indicating a projection matrix associated with the downlink channel. The communications manager 720 is capable of, configured to, or operable to support a means for receiving data signaling from the network entity on the downlink channel based on receiving the second control signaling. The communications manager 720 is capable of, configured to, or operable to support a means for demodulating the data signaling according to a channel estimation associated with the downlink channel that is based on the projection matrix.

By including or configuring the communications manager 720 in accordance with examples as described herein, the device 705 may support techniques for reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of techniques for downlink channel estimation as described herein, or the at least one processor 740 and the at least one memory 730 may be otherwise configured to, individually or collectively, perform or support such operations.

Figure 8:
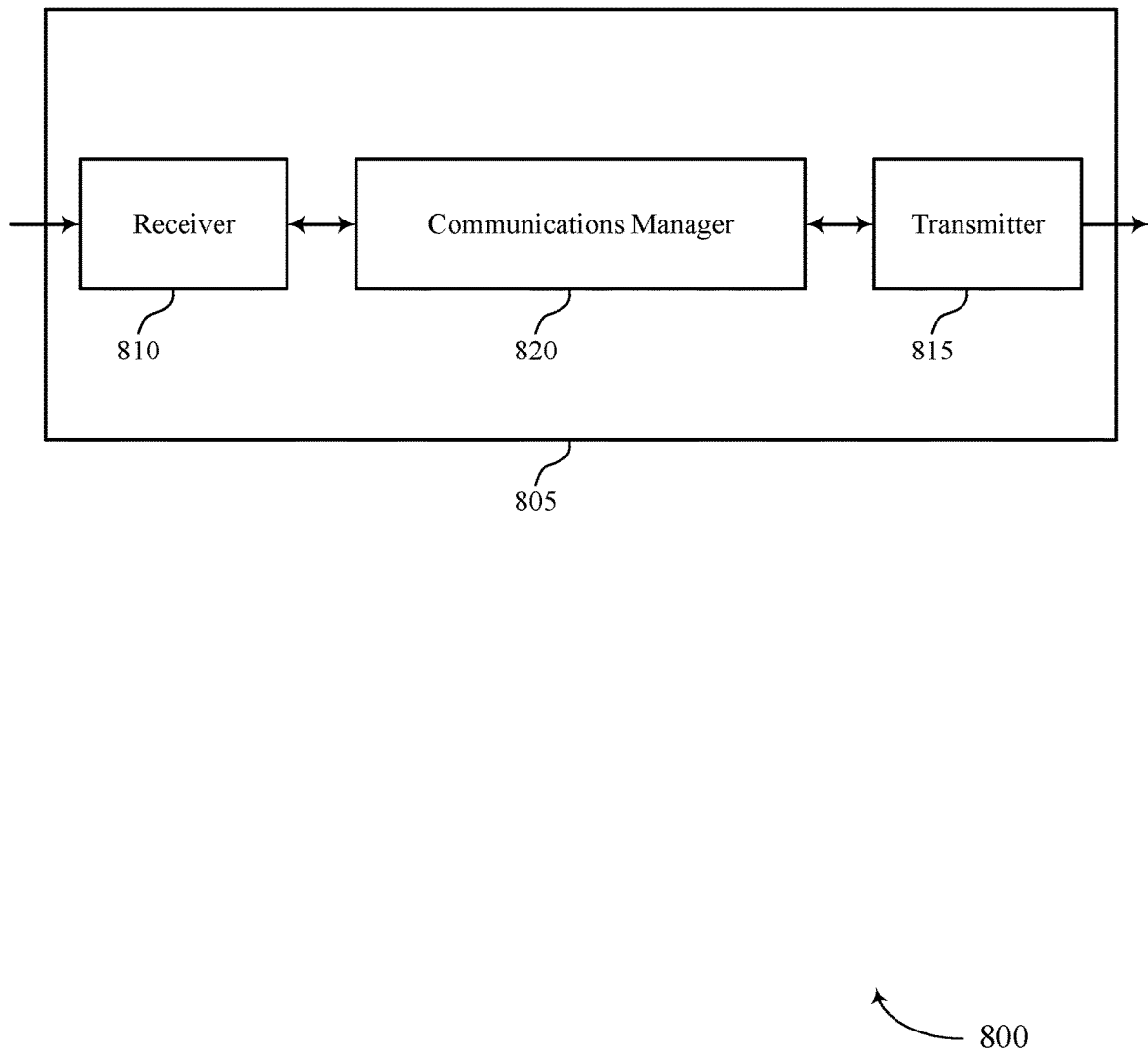
FIGS. 8 and 9 show block diagrams of devices that support techniques for downlink channel estimation in accordance with one or more aspects of the present disclosure.

FIG. 8 shows a block diagram 800 of a device 805 that supports techniques for downlink channel estimation in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for downlink channel estimation as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for receiving, from a UE, first control signaling indicating a first shifting time offset indication associated with a downlink channel of a cell associated with the network entity. The communications manager 820 is capable of, configured to, or operable to support a means for transmitting, to the UE, second control signaling indicating a projection matrix associated with the downlink channel, where the projection matrix is determined based on the first shifting time offset indication. The communications manager 820 is capable of, configured to, or operable to support a means for transmitting data signaling to the UE on the downlink channel based on transmitting the second control signaling.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, and more efficient utilization of communication resources.

Figure 9:
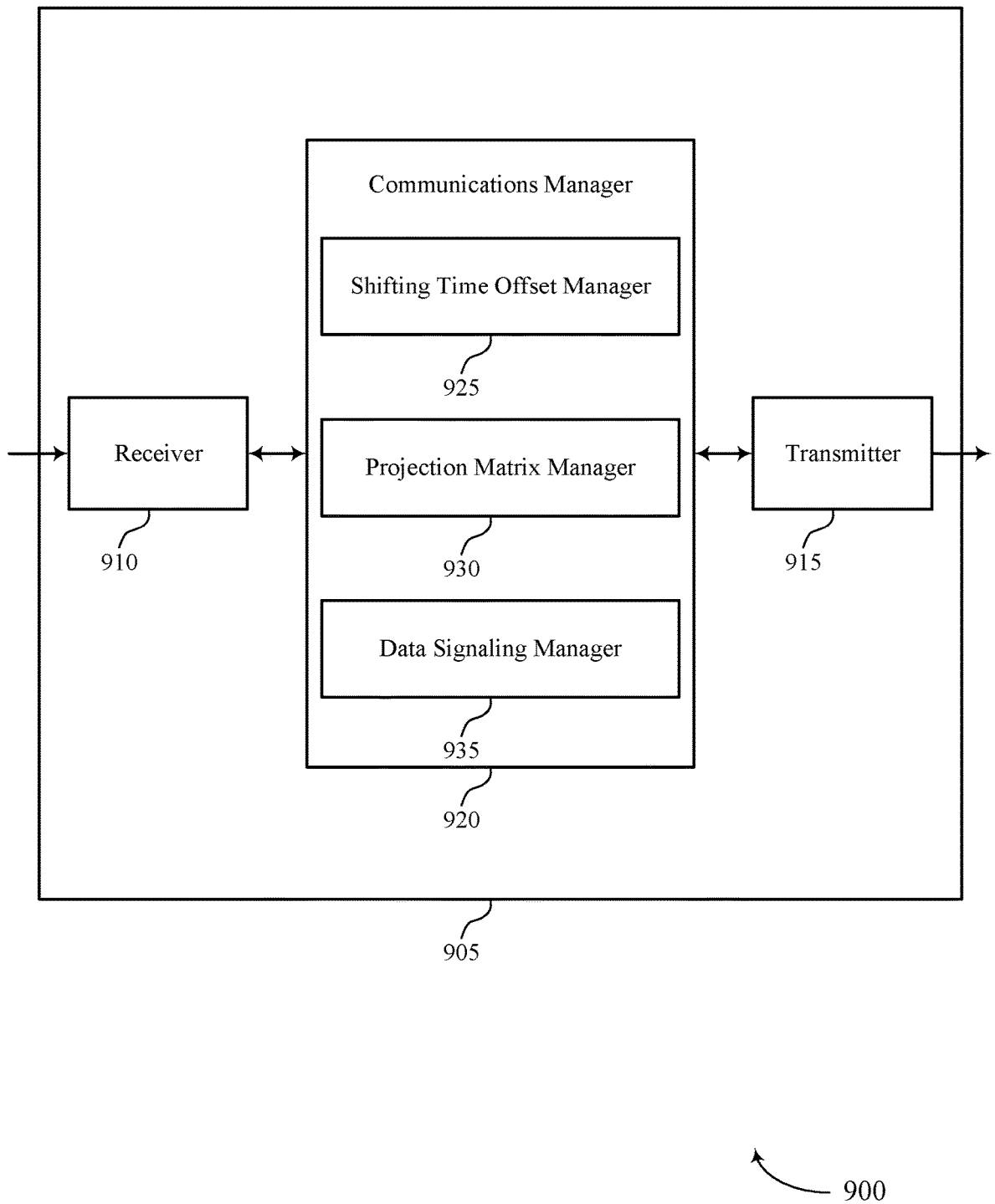

FIG. 9 shows a block diagram 900 of a device 905 that supports techniques for downlink channel estimation in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for downlink channel estimation as described herein. For example, the communications manager 920 may include a shifting time offset manager 925, a projection matrix manager 930, a data signaling manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The shifting time offset manager 925 is capable of, configured to, or operable to support a means for receiving, from a UE, first control signaling indicating a first shifting time offset indication associated with a downlink channel of a cell associated with the network entity. The projection matrix manager 930 is capable of, configured to, or operable to support a means for transmitting, to the UE, second control signaling indicating a projection matrix associated with the downlink channel, where the projection matrix is determined based on the first shifting time offset indication. The data signaling manager 935 is capable of, configured to, or operable to support a means for transmitting data signaling to the UE on the downlink channel based on transmitting the second control signaling.

Figure 10:
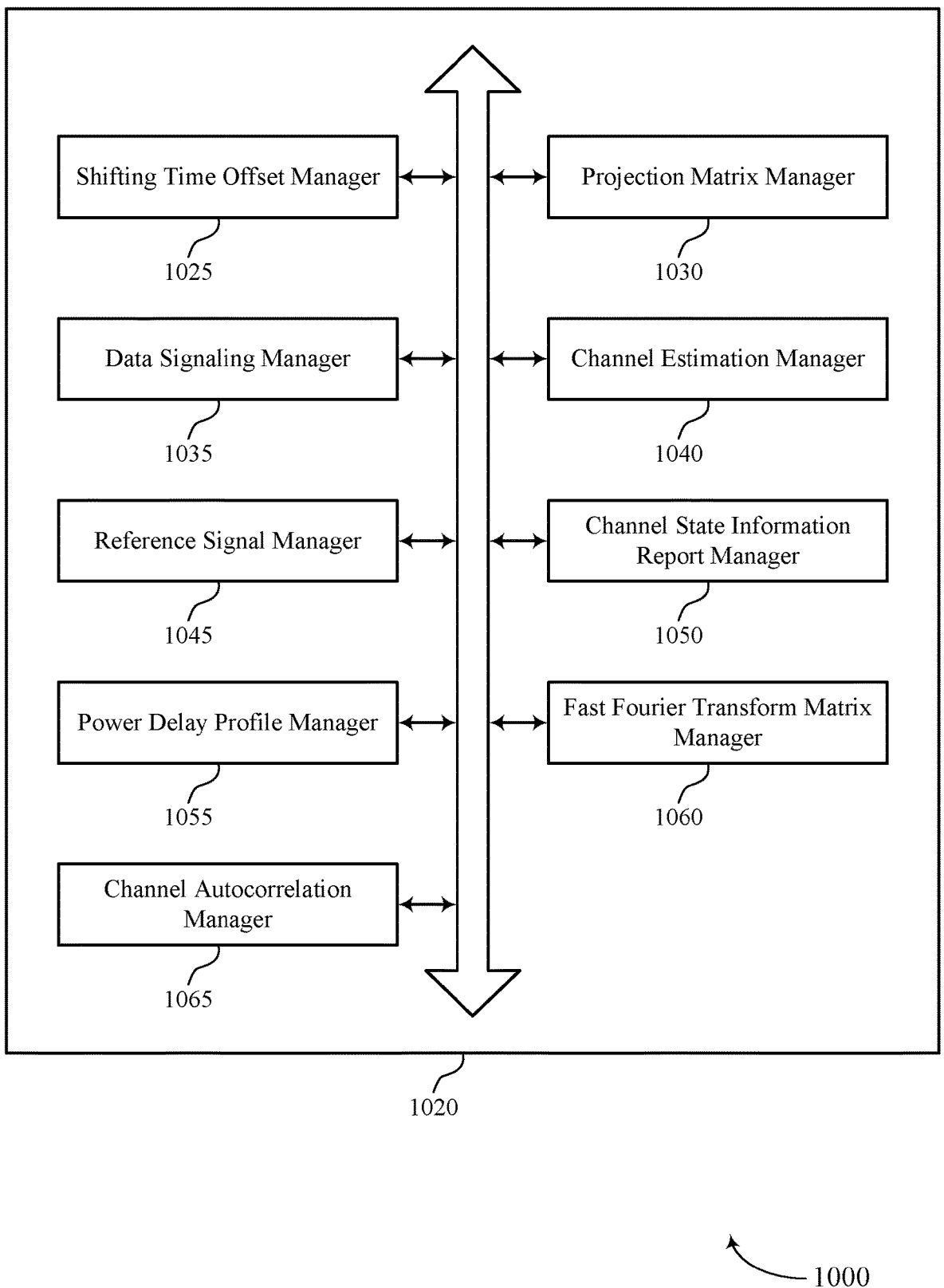
FIG. 10 shows a block diagram of a communications manager that supports techniques for downlink channel estimation in accordance with one or more aspects of the present disclosure.

FIG. 10 shows a block diagram 1000 of a communications manager 1020 that supports techniques for downlink channel estimation in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for downlink channel estimation as described herein. For example, the communications manager 1020 may include a shifting time offset manager 1025, a projection matrix manager 1030, a data signaling manager 1035, a channel estimation manager 1040, a reference signal manager 1045, a channel state information report manager 1050, a power delay profile manager 1055, a Fast Fourier Transform matrix manager 1060, a channel autocorrelation manager 1065, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication in accordance with examples as disclosed herein. The shifting time offset manager 1025 is capable of, configured to, or operable to support a means for receiving, from a UE, first control signaling indicating a first shifting time offset indication associated with a downlink channel of a cell associated with the network entity. The projection matrix manager 1030 is capable of, configured to, or operable to support a means for transmitting, to the UE, second control signaling indicating a projection matrix associated with the downlink channel, where the projection matrix is determined based on the first shifting time offset indication. The data signaling manager 1035 is capable of, configured to, or operable to support a means for transmitting data signaling to the UE on the downlink channel based on transmitting the second control signaling.

In some examples, the channel estimation manager 1040 is capable of, configured to, or operable to support a means for determining a channel estimation associated with an uplink channel of the cell, where the projection matrix is determined based on the channel estimation.

In some examples, the downlink channel and an uplink channel of the cell are time division multiplexed.

In some examples, the reference signal manager 1045 is capable of, configured to, or operable to support a means for transmitting, to the UE based on transmitting the projection matrix, a reference signal.

In some examples, the channel state information report manager 1050 is capable of, configured to, or operable to support a means for receiving, from the UE, third control signaling indicating a channel state information report associated with the downlink channel, where the projection matrix is based on the channel state information report.

In some examples, the projection matrix manager 1030 is capable of, configured to, or operable to support a means for determining, in response to receiving the first control signaling, the projection matrix based on a time domain channel autocorrelation associated with an uplink channel of the cell, a noise covariance associated with the uplink channel, a Fast Fourier Transform matrix based on the first shifting time offset indication, or a combination thereof.

In some examples, to support determining the projection matrix, the Fast Fourier Transform matrix manager 1060 is capable of, configured to, or operable to support a means for determining the Fast Fourier Transform matrix based on a power delay profile associated with the network entity.

In some examples, to support determining the projection matrix, the channel autocorrelation manager 1065 is capable of, configured to, or operable to support a means for determining the time domain channel autocorrelation based on a power delay profile associated with the network entity.

In some examples, to support determining the projection matrix, the power delay profile manager 1055 is capable of, configured to, or operable to support a means for receiving, from the UE, a third control signaling indicating a channel power delay profile associated with the UE. In some examples, to support determining the projection matrix, the projection matrix manager 1030 is capable of, configured to, or operable to support a means for determining the projection matrix based on the channel power delay profile associated with the UE.

In some examples, the projection matrix manager 1030 is capable of, configured to, or operable to support a means for transmitting, to the UE based on determining a change of a power delay profile associated with the network entity, fourth control signaling indicating a second projection matrix associated with a channel estimation of an uplink channel of the network entity.

In some examples, the shifting time offset manager 1025 is capable of, configured to, or operable to support a means for receiving, from the UE, a third control signaling indicating a second shifting time offset indication associated with the downlink channel of the UE, where the second shifting time offset indication is different from the first shifting time offset indication. In some examples, the projection matrix manager 1030 is capable of, configured to, or operable to support a means for transmitting, to the UE based on transmitting the third control signaling, fourth control signaling indicating a second projection matrix associated with a channel estimation of an uplink channel of the network entity.

Figure 11:
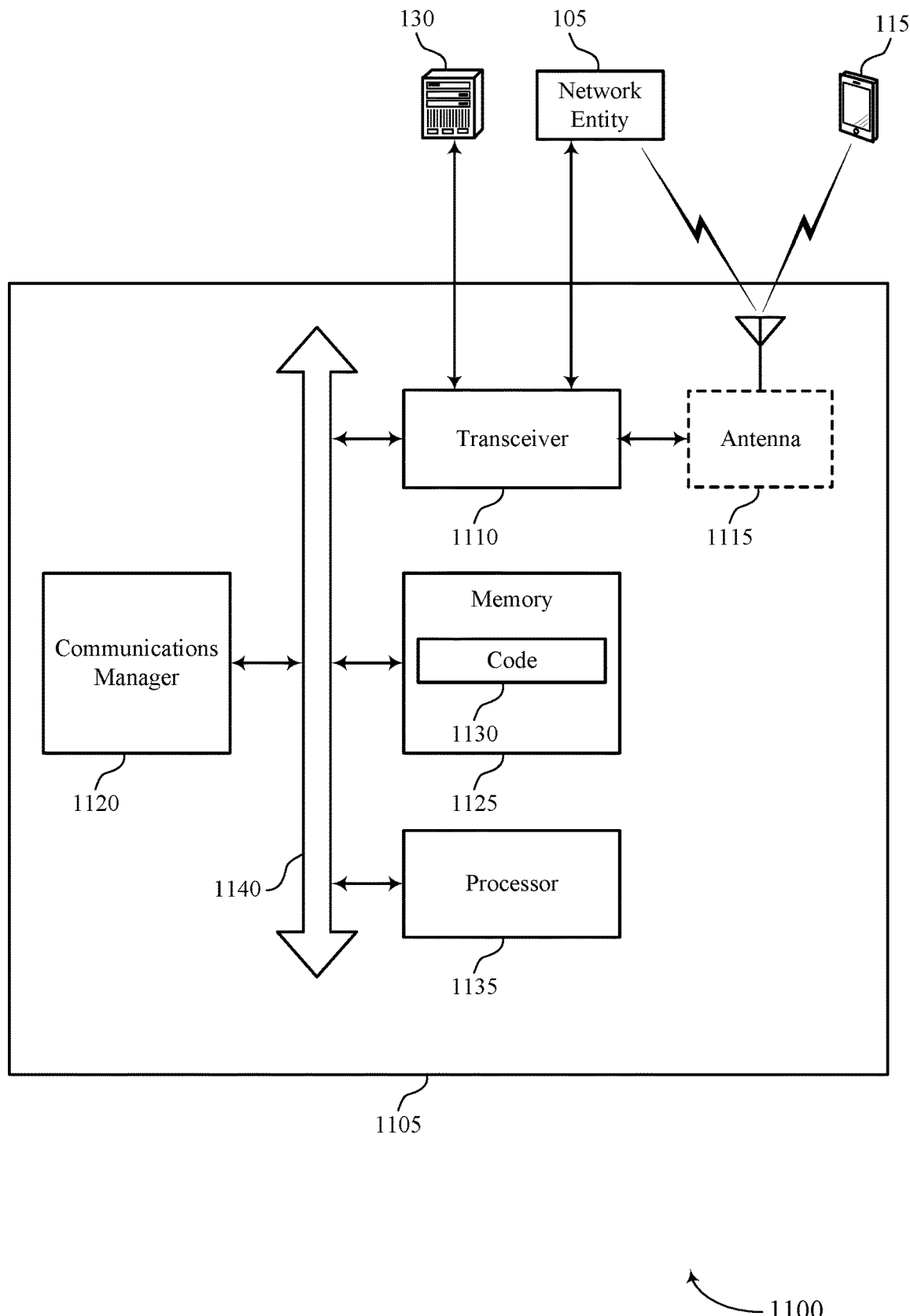
FIG. 11 shows a diagram of a system including a device that supports techniques for downlink channel estimation in accordance with one or more aspects of the present disclosure.

FIG. 11 shows a diagram of a system 1100 including a device 1105 that supports techniques for downlink channel estimation in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting techniques for downlink channel estimation). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication in accordance with examples as disclosed herein. For example, the communications manager 1120 is capable of, configured to, or operable to support a means for receiving, from a UE, first control signaling indicating a first shifting time offset indication associated with a downlink channel of a cell associated with the network entity. The communications manager 1120 is capable of, configured to, or operable to support a means for transmitting, to the UE, second control signaling indicating a projection matrix associated with the downlink channel, where the projection matrix is determined based on the first shifting time offset indication. The communications manager 1120 is capable of, configured to, or operable to support a means for transmitting data signaling to the UE on the downlink channel based on transmitting the second control signaling.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of techniques for downlink channel estimation as described herein, or the at least one processor 1135 and the at least one memory 1125 may be otherwise configured to, individually or collectively, perform or support such operations.

Figure 12:
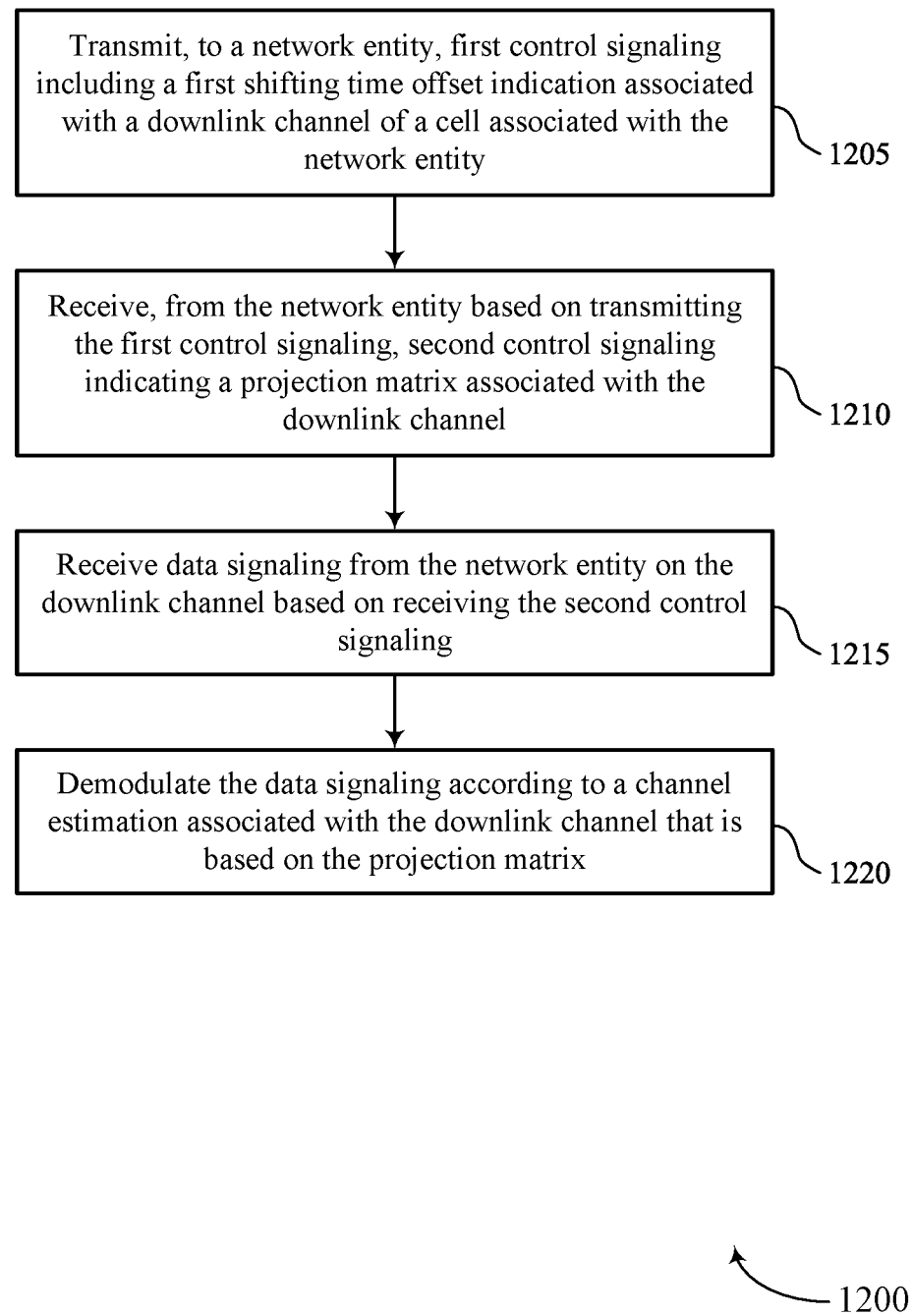
FIGS. 12 through 15 show flowcharts illustrating methods that support techniques for downlink channel estimation in accordance with one or more aspects of the present disclosure.

FIG. 12 shows a flowchart illustrating a method 1200 that supports techniques for downlink channel estimation in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting, to a network entity, first control signaling including a first shifting time offset indication associated with a downlink channel of a cell associated with the network entity. The operations of block 1205 may be performed in accordance with examples as disclosed herein. In some examples, aspects of the operations of 1205 may be performed by a shifting time offset manager 625 as described with reference to FIG. 6.

At 1210, the method may include receiving, from the network entity based on transmitting the first control signaling, second control signaling indicating a projection matrix associated with the downlink channel. The operations of block 1210 may be performed in accordance with examples as disclosed herein. In some examples, aspects of the operations of 1210 may be performed by a projection matrix manager 630 as described with reference to FIG. 6.

At 1215, the method may include receiving data signaling from the network entity on the downlink channel based on receiving the second control signaling. The operations of block 1215 may be performed in accordance with examples as disclosed herein. In some examples, aspects of the operations of 1215 may be performed by a data signaling manager 635 as described with reference to FIG. 6.

At 1220, the method may include demodulating the data signaling according to a channel estimation associated with the downlink channel that is based on the projection matrix.

The operations of block 1220 may be performed in accordance with examples as disclosed herein. In some examples, aspects of the operations of 1220 may be performed by a demodulation manager 640 as described with reference to FIG. 6.

Figure 13:
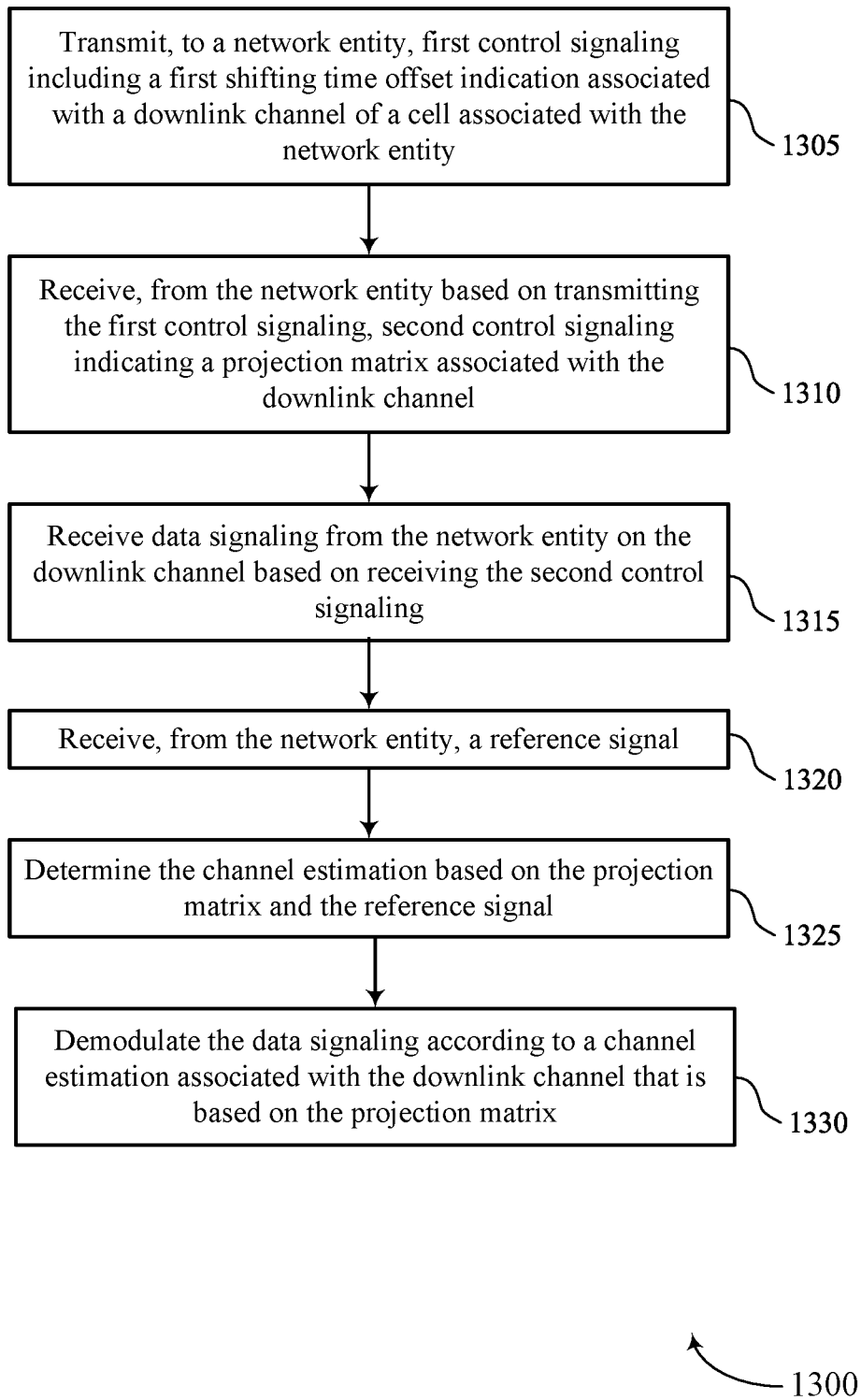

FIG. 13 shows a flowchart illustrating a method 1300 that supports techniques for downlink channel estimation in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity, first control signaling including a first shifting time offset indication associated with a downlink channel of a cell associated with the network entity. The operations of block 1305 may be performed in accordance with examples as disclosed herein. In some examples, aspects of the operations of 1305 may be performed by a shifting time offset manager 625 as described with reference to FIG. 6.

At 1310, the method may include receiving, from the network entity based on transmitting the first control signaling, second control signaling indicating a projection matrix associated with the downlink channel. The operations of block 1310 may be performed in accordance with examples as disclosed herein. In some examples, aspects of the operations of 1310 may be performed by a projection matrix manager 630 as described with reference to FIG. 6.

At 1315, the method may include receiving data signaling from the network entity on the downlink channel based on receiving the second control signaling. The operations of block 1315 may be performed in accordance with examples as disclosed herein. In some examples, aspects of the operations of 1315 may be performed by a data signaling manager 635 as described with reference to FIG. 6.

At 1320, the method may include receiving, from the network entity, a reference signal. The operations of block 1325 may be performed in accordance with examples as disclosed herein. In some examples, aspects of the operations of 1325 may be performed by a reference signal manager 645 as described with reference to FIG. 6.

At 1325, the method may include determining the channel estimation based on the projection matrix and the reference signal. The operations of block 1330 may be performed in accordance with examples as disclosed herein. In some examples, aspects of the operations of 1330 may be performed by a channel estimation manager 650 as described with reference to FIG. 6.

At 1330, the method may include demodulating the data signaling according to a channel estimation associated with the downlink channel that is based on the projection matrix. The operations of block 1320 may be performed in accordance with examples as disclosed herein. In some examples, aspects of the operations of 1320 may be performed by a demodulation manager 640 as described with reference to FIG. 6.

Figure 14:
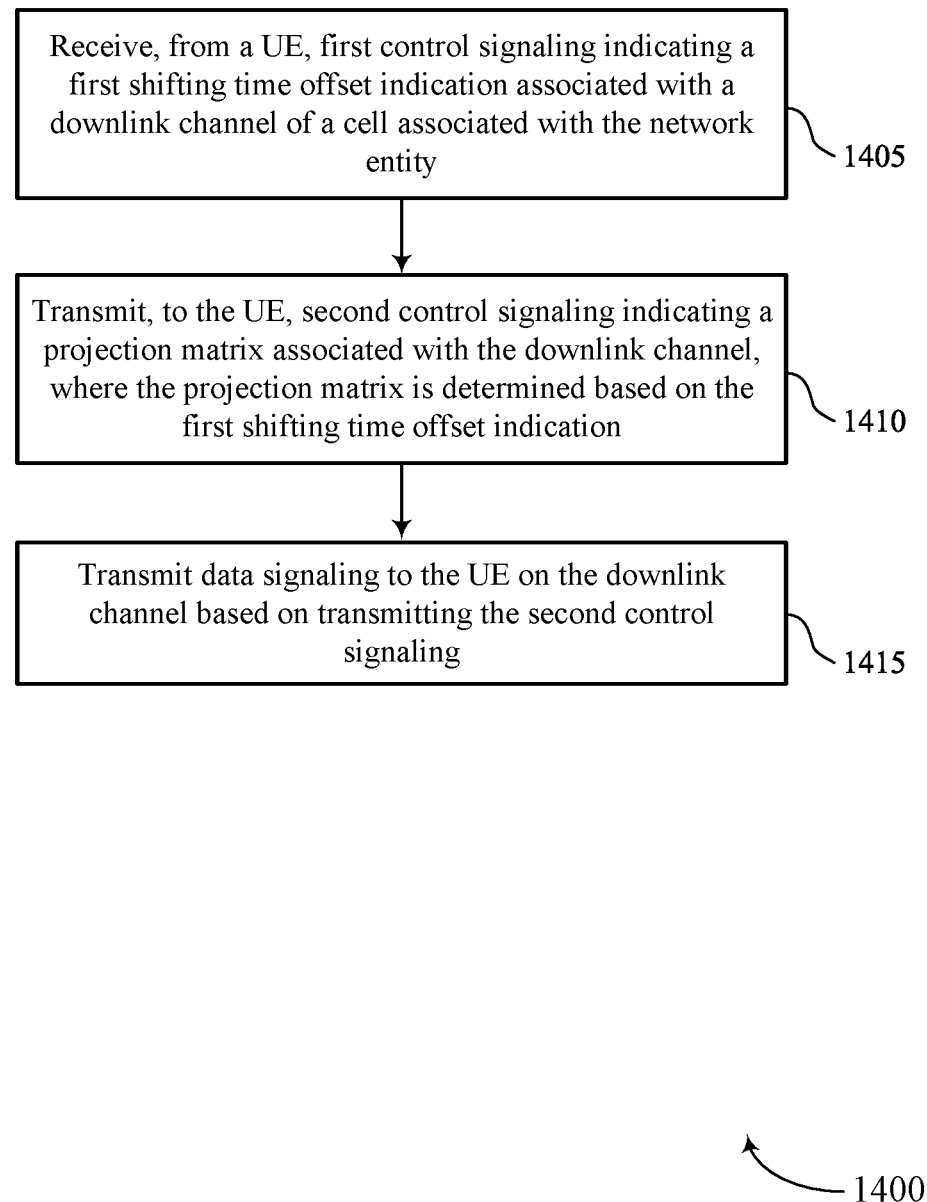

FIG. 14 shows a flowchart illustrating a method 1400 that supports techniques for downlink channel estimation in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include receiving, from a UE, first control signaling indicating a first shifting time offset indication associated with a downlink channel of a cell associated with the network entity. The operations of block 1405 may be performed in accordance with examples as disclosed herein. In some examples, aspects of the operations of 1405 may be performed by a shifting time offset manager 1025 as described with reference to FIG. 10.

At 1410, the method may include transmitting, to the UE, second control signaling indicating a projection matrix associated with the downlink channel, where the projection matrix is determined based on the first shifting time offset indication. The operations of block 1410 may be performed in accordance with examples as disclosed herein. In some examples, aspects of the operations of 1410 may be performed by a projection matrix manager 1030 as described with reference to FIG. 10.

At 1415, the method may include transmitting data signaling to the UE on the downlink channel based on transmitting the second control signaling. The operations of block 1415 may be performed in accordance with examples as disclosed herein. In some examples, aspects of the operations of 1415 may be performed by a data signaling manager 1035 as described with reference to FIG. 10.

Figure 15:
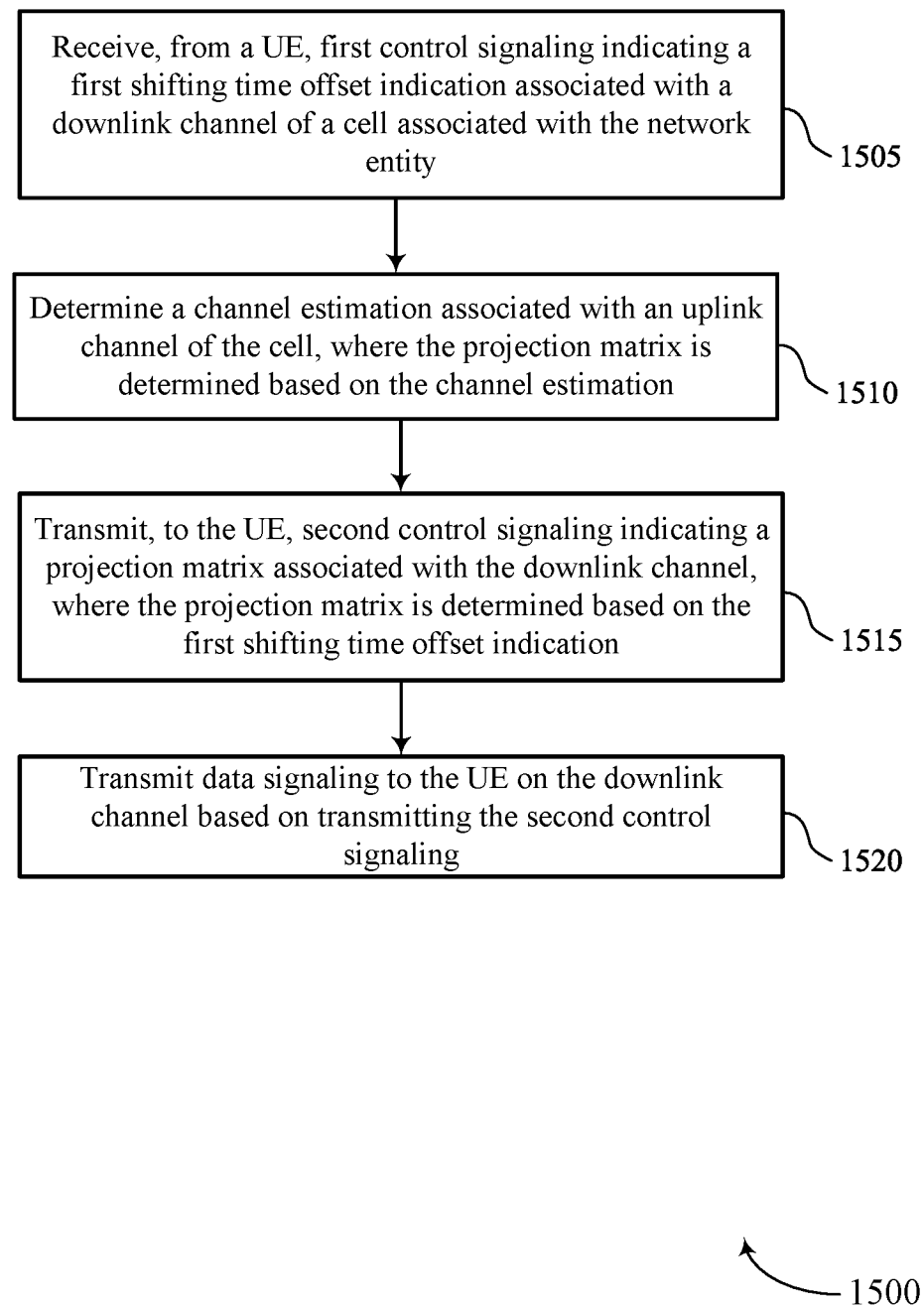

FIG. 15 shows a flowchart illustrating a method 1500 that supports techniques for downlink channel estimation in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from a UE, first control signaling indicating a first shifting time offset indication associated with a downlink channel of a cell associated with the network entity. The operations of block 1505 may be performed in accordance with examples as disclosed herein. In some examples, aspects of the operations of 1505 may be performed by a shifting time offset manager 1025 as described with reference to FIG. 10.

At 1510, the method may include determining a channel estimation associated with an uplink channel of the cell, where the projection matrix is determined based on the channel estimation. The operations of block 1520 may be performed in accordance with examples as disclosed herein. In some examples, aspects of the operations of 1520 may be performed by a channel estimation manager 1040 as described with reference to FIG. 10.

At 1515, the method may include transmitting, to the UE, second control signaling indicating a projection matrix associated with the downlink channel, where the projection matrix is determined based on the first shifting time offset indication. The operations of block 1510 may be performed in accordance with examples as disclosed herein. In some examples, aspects of the operations of 1510 may be performed by a projection matrix manager 1030 as described with reference to FIG. 10.

At 1520, the method may include transmitting data signaling to the UE on the downlink channel based on transmitting the second control signaling. The operations of block 1515 may be performed in accordance with examples as disclosed herein. In some examples, aspects of the operations of 1515 may be performed by a data signaling manager 1035 as described with reference to FIG. 10.

The following provides an overview of aspects of the present disclosure:

Aspect 1: A method for wireless communication by a UE, comprising: transmitting, to a network entity, first control signaling comprising a first shifting time offset indication associated with a downlink channel of a cell associated with the network entity; receiving, from the network entity based at least in part on transmitting the first control signaling, second control signaling indicating a projection matrix associated with the downlink channel; receiving data signaling from the network entity on the downlink channel based at least in part on receiving the second control signaling; and demodulating the data signaling according to a channel estimation associated with the downlink channel that is based at least in part on the projection matrix.

Aspect 2: The method of aspect 1, wherein the downlink channel and an uplink channel of the cell are time division multiplexed.

Aspect 3: The method of any of aspects 1 through 2, wherein receiving the data signaling further comprises: receiving, from the network entity, a reference signal; and determining the channel estimation based at least in part on the projection matrix and the reference signal.

Aspect 4: The method of aspect 3, wherein determining the channel estimation further comprises: descrambling the reference signal; and determining the channel estimation based at least in part on the projection matrix and the descrambled reference signal.

Aspect 5: The method of any of aspects 1 through 4, wherein in the projection matrix is based at least in part on a time domain channel autocorrelation associated with an uplink channel of the cell, a noise covariance associated with the uplink channel, a Fast Fourier Transform matrix based at least in part on the first shifting time offset indication, or a combination thereof.

Aspect 6: The method of any of aspects 1 through 5, further comprising: transmitting, to the network entity, third control signaling indicating a channel power delay profile associated with the UE, wherein the projection matrix is based at least in part on the channel power delay profile.

Aspect 7: The method of any of aspects 1 through 6, further comprising: transmitting, to the network entity, third control signaling indicating a channel state information report associated with the downlink channel, wherein the projection matrix is based at least in part on the channel state information report.

Aspect 8: The method of any of aspects 1 through 7, further comprising: transmitting, to the network entity, third control signaling indicating a second shifting time offset indication associated with the downlink channel, wherein the second shifting time offset indication is different from the first shifting time offset indication; receiving, from the network entity based at least in part on transmitting the third control signaling, fourth control signaling indicating a second projection matrix associated with the downlink channel; receiving second data signaling, from the network entity on the downlink channel based at least in part on receiving the fourth control signaling; and demodulating the second data signaling according to a second channel estimation that is based at least in part on the second projection matrix.

Aspect 9: A method for wireless communication by a network entity, comprising: receiving, from a UE, first control signaling indicating a first shifting time offset indication associated with a downlink channel of a cell associated with the network entity; transmitting, to the UE, second control signaling indicating a projection matrix associated with the downlink channel, wherein the projection matrix is determined based at least in part on the first shifting time offset indication; and transmitting data signaling to the UE on the downlink channel based at least in part on transmitting the second control signaling.

Aspect 10: The method of aspect 9, wherein transmitting the second control signaling further comprising: determining a channel estimation associated with an uplink channel of the cell, wherein the projection matrix is determined based at least in part on the channel estimation.

Aspect 11: The method of any of aspects 9 through 10, wherein the downlink channel and an uplink channel of the cell are time division multiplexed.

Aspect 12: The method of any of aspects 9 through 11, further comprising: transmitting, to the UE based at least in part on transmitting the projection matrix, a reference signal.

Aspect 13: The method of any of aspects 9 through 12, further comprising: receiving, from the UE, third control signaling indicating a channel state information report associated with the downlink channel, wherein the projection matrix is based at least in part on the channel state information report.

Aspect 14: The method of any of aspects 9 through 13, further comprising: determining, in response to receiving the first control signaling, the projection matrix based at least in part on a time domain channel autocorrelation associated with an uplink channel of the cell, a noise covariance associated with the uplink channel, a Fast Fourier Transform matrix based at least in part on the first shifting time offset indication, or a combination thereof.

Aspect 15: The method of aspect 14, wherein determining the projection matrix further comprises: determining the Fast Fourier Transform matrix based at least in part on a power delay profile associated with the network entity.

Aspect 16: The method of any of aspects 14 through 15, wherein determining the projection matrix further comprises: determining the time domain channel autocorrelation based at least in part on a power delay profile associated with the network entity.

Aspect 17: The method of any of aspects 9 through 16, wherein determining the projection matrix further comprises: receiving, from the UE, a third control signaling indicating a channel power delay profile associated with the UE; and determining the projection matrix based at least in part on the channel power delay profile associated with the UE.

Aspect 18: The method of any of aspects 9 through 17, further comprising: transmitting, to the UE based at least in part on determining a change of a power delay profile associated with the network entity, fourth control signaling indicating a second projection matrix associated with a channel estimation of an uplink channel of the network entity.

Aspect 19: The method of any of aspects 9 through 18, further comprising: receiving, from the UE, a third control signaling indicating a second shifting time offset indication associated with the downlink channel of the UE, wherein the second shifting time offset indication is different from the first shifting time offset indication; and transmitting, to the UE based at least in part on transmitting the third control signaling, fourth control signaling indicating a second projection matrix associated with a channel estimation of an uplink channel of the network entity.

Aspect 20: A UE for wireless communication, comprising one or more memories storing processor-executable code, and one or more processors coupled with the one or more memories and individually or collectively operable to execute the code to cause the UE to perform a method of any of aspects 1 through 8.

Aspect 21: A UE for wireless communication, comprising at least one means for performing a method of any of aspects 1 through 8.

Aspect 22: A non-transitory computer-readable medium storing code for wireless communication, the code comprising instructions executable by a processor to perform a method of any of aspects 1 through 8.

Aspect 23: A network entity for wireless communication, comprising one or more memories storing processor-executable code, and one or more processors coupled with the one or more memories and individually or collectively operable to execute the code to cause the network entity to perform a method of any of aspects 9 through 19.

Aspect 24: A network entity for wireless communication, comprising at least one means for performing a method of any of aspects 9 through 19.

Aspect 25: A non-transitory computer-readable medium storing code for wireless communication, the code comprising instructions executable by a processor to perform a method of any of aspects 9 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
    one or more memories storing processor-executable code; and
    one or more processors coupled with the one or more memories and individually or collectively operable to execute the code to cause the UE to:
        transmit, to a network entity, first control signaling comprising a first shifting time offset indication associated with a downlink channel of a cell associated with the network entity;
        receive, from the network entity based at least in part on transmitting the first control signaling, second control signaling indicating a projection matrix associated with the downlink channel;
        receive data signaling from the network entity on the downlink channel based at least in part on receiving the second control signaling; and
        demodulate the data signaling according to a channel estimation associated with the downlink channel that is based at least in part on the projection matrix.

2. The UE of claim 1, wherein the downlink channel and an uplink channel of the cell are time division multiplexed.

3. The UE of claim 1, wherein, to receive the data signaling, the one or more processors are individually or collectively further operable to execute the code to cause the UE to:
    receive, from the network entity, a reference signal; and
    determine the channel estimation based at least in part on the projection matrix and the reference signal.

4. The UE of claim 3, wherein, to determine the channel estimation, the one or more processors are individually or collectively further operable to execute the code to cause the UE to:
    descramble the reference signal; and
    determine the channel estimation based at least in part on the projection matrix and the descrambled reference signal.

5. The UE of claim 1, wherein in the projection matrix is based at least in part on a time domain channel autocorrelation associated with an uplink channel of the cell, a noise covariance associated with the uplink channel, a Fast Fourier Transform matrix based at least in part on the first shifting time offset indication, or a combination thereof.

6. The UE of claim 1, wherein the one or more processors are individually or collectively further operable to execute the code to cause the UE to:
    transmit, to the network entity, third control signaling indicating a channel power delay profile associated with the UE, wherein the projection matrix is based at least in part on the channel power delay profile.

7. The UE of claim 1, wherein the one or more processors are individually or collectively further operable to execute the code to cause the UE to:
    transmit, to the network entity, third control signaling indicating a channel state information report associated with the downlink channel, wherein the projection matrix is based at least in part on the channel state information report.

8. The UE of claim 1, wherein the one or more processors are individually or collectively further operable to execute the code to cause the UE to:
    transmit, to the network entity, third control signaling indicating a second shifting time offset indication associated with the downlink channel, wherein the second shifting time offset indication is different from the first shifting time offset indication;

receive, from the network entity based at least in part on transmitting the third control signaling, fourth control signaling indicating a second projection matrix associated with the downlink channel;

receive second data signaling, from the network entity on the downlink channel based at least in part on receiving the fourth control signaling; and demodulate the second data signaling according to a second channel estimation that is based at least in part on the second projection matrix.

9. A network entity, comprising:

one or more memories storing processor-executable code; and one or more processors coupled with the one or more memories and individually or collectively operable to execute the code to cause the network entity to:

receive, from a user equipment (UE), first control signaling indicating a first shifting time offset indication associated with a downlink channel of a cell associated with the network entity;

transmit, to the UE, second control signaling indicating a projection matrix associated with the downlink channel, wherein the projection matrix is determined based at least in part on the first shifting time offset indication; and transmit data signaling to the UE on the downlink channel based at least in part on transmitting the second control signaling.

10. The network entity of claim 9, wherein the one or more processors are individually or collectively further operable to execute the code to cause the network entity to: determine a channel estimation associated with an uplink channel of the cell, wherein the projection matrix is determined based at least in part on the channel estimation.

11. The network entity of claim 9, wherein the downlink channel and an uplink channel of the cell are time division multiplexed.

12. The network entity of claim 9, wherein the one or more processors are individually or collectively further operable to execute the code to cause the network entity to: transmit, to the UE based at least in part on transmitting the projection matrix, a reference signal.

13. The network entity of claim 9, wherein the one or more processors are individually or collectively further operable to execute the code to cause the network entity to: receive, from the UE, third control signaling indicating a channel state information report associated with the downlink channel, wherein the projection matrix is based at least in part on the channel state information report.

14. The network entity of claim 9, wherein the one or more processors are individually or collectively further operable to execute the code to cause the network entity to: determine, in response to receiving the first control signaling, the projection matrix based at least in part on a time domain channel autocorrelation associated with an uplink channel of the cell, a noise covariance associated with the uplink channel, a Fast Fourier Transform matrix based at least in part on the first shifting time offset indication, or a combination thereof.

15. The network entity of claim 14, wherein, to determine the projection matrix, the one or more processors are individually or collectively further operable to execute the code to cause the network entity to:

determine the Fast Fourier Transform matrix based at least in part on a power delay profile associated with the network entity.

16. The network entity of claim 14, wherein, to determine the projection matrix, the one or more processors are individually or collectively further operable to execute the code to cause the network entity to:

determine the time domain channel autocorrelation based at least in part on a power delay profile associated with the network entity.

17. The network entity of claim 9, wherein, to determine the projection matrix, the one or more processors are individually or collectively further operable to execute the code to cause the network entity to:

receive, from the UE, a third control signaling indicating a channel power delay profile associated with the UE; and determine the projection matrix based at least in part on the channel power delay profile associated with the UE.

18. The network entity of claim 9, wherein the one or more processors are individually or collectively further operable to execute the code to cause the network entity to:

transmit, to the UE based at least in part on determining a change of a power delay profile associated with the network entity, fourth control signaling indicating a second projection matrix associated with a channel estimation of an uplink channel of the network entity.

19. The network entity of claim 9, wherein the one or more processors are individually or collectively further operable to execute the code to cause the network entity to:

receive, from the UE, a third control signaling indicating a second shifting time offset indication associated with the downlink channel of the UE, wherein the second shifting time offset indication is different from the first shifting time offset indication; and transmit, to the UE based at least in part on transmitting the third control signaling, fourth control signaling indicating a second projection matrix associated with a channel estimation of an uplink channel of the network entity.

20. A method for wireless communication by a user equipment (UE), comprising:

transmitting, to a network entity, first control signaling comprising a first shifting time offset indication associated with a downlink channel of a cell associated with the network entity;

receiving, from the network entity based at least in part on transmitting the first control signaling, second control signaling indicating a projection matrix associated with the downlink channel;

receiving data signaling from the network entity on the downlink channel based at least in part on receiving the second control signaling; and demodulating the data signaling according to a channel estimation associated with the downlink channel that is based at least in part on the projection matrix.

21. The method of claim 20, wherein receiving the data signaling further comprises:

receiving, from the network entity, a reference signal; and determining the channel estimation based at least in part on the projection matrix and the reference signal.

22. The method of claim 21, wherein determining the channel estimation further comprises:
   descrambling the reference signal; and
   determining the channel estimation based at least in part on the projection matrix and the descrambled reference signal.

23. The method of claim 20, wherein in the projection matrix is based at least in part on a time domain channel autocorrelation associated with an uplink channel of the cell, a noise covariance associated with the uplink channel, a Fast Fourier Transform matrix based at least in part on the first shifting time offset indication, or a combination thereof.

24. The method of claim 20, further comprising:
   transmitting, to the network entity, third control signaling indicating a channel power delay profile associated with the UE, wherein the projection matrix is based at least in part on the channel power delay profile.

25. The method of claim 20, further comprising:
   transmitting, to the network entity, third control signaling indicating a channel state information report associated with the downlink channel, wherein the projection matrix is based at least in part on the channel state information report.

26. A method for wireless communication by a network entity, comprising:
   receiving, from a user equipment (UE), first control signaling indicating a first shifting time offset indication associated with a downlink channel of a cell associated with the network entity;
   transmitting, to the UE, second control signaling indicating a projection matrix associated with the downlink channel, wherein the projection matrix is determined based at least in part on the first shifting time offset indication; and
   transmitting data signaling to the UE on the downlink channel based at least in part on transmitting the second control signaling.

27. The method of claim 26, wherein transmitting the second control signaling further comprising:
   determining a channel estimation associated with an uplink channel of the cell, wherein the projection matrix is determined based at least in part on the channel estimation.

28. The method of claim 26, further comprising:
   transmitting, to the UE based at least in part on transmitting the projection matrix, a reference signal.

29. The method of claim 26, further comprising:
   determining, in response to receiving the first control signaling, the projection matrix based at least in part on a time domain channel autocorrelation associated with an uplink channel of the cell, a noise covariance associated with the uplink channel, a Fast Fourier Transform matrix based at least in part on the first shifting time offset indication, or a combination thereof.

30. The method of claim 26, wherein determining the projection matrix further comprises:
   receiving, from the UE, a third control signaling indicating a channel power delay profile associated with the UE; and
   determining the projection matrix based at least in part on the channel power delay profile associated with the UE.

* * * * *